(12) United States Patent
Li et al.

(10) Patent No.: US 9,850,379 B2
(45) Date of Patent: Dec. 26, 2017

(54) GELS AND HYDROGELS

(76) Inventors: Naihong Li, Cupertino, CA (US);
Michael C. Williams, Edmonton (CA)

(*) Notice: Subject to any disclaimer, the term of this patent is extended or adjusted under 35 U.S.C. 154(b) by 908 days.

(21) Appl. No.: 13/884,218

(22) PCT Filed: Nov. 8, 2011

(86) PCT No.: PCT/US2011/059837
§ 371 (c)(1),
(2), (4) Date: Jul. 22, 2013

(87) PCT Pub. No.: WO2012/064787
PCT Pub. Date: May 18, 2012

(65) Prior Publication Data
US 2013/0303665 A1   Nov. 14, 2013

Related U.S. Application Data

(60) Provisional application No. 61/411,462, filed on Nov. 8, 2010, provisional application No. 61/412,780, filed on Nov. 11, 2010.

(51) Int. Cl.
| | | |
|---|---|---|
| *C08J 3/075* | (2006.01) | |
| *C08L 71/08* | (2006.01) | |
| *C09K 17/16* | (2006.01) | |
| *C08L 33/02* | (2006.01) | |
| *C08L 71/02* | (2006.01) | |

(52) U.S. Cl.
CPC .............. *C08L 71/08* (2013.01); *C08J 3/075* (2013.01); *C08L 33/02* (2013.01); *C08L 71/02* (2013.01); *C09K 17/16* (2013.01); *C08G 2210/00* (2013.01); *C08J 2329/00* (2013.01); *C08J 2333/02* (2013.01); *C08L 2205/05* (2013.01)

(58) Field of Classification Search
CPC ............ C08L 33/02; C08L 71/08; C08J 3/075
USPC ....... 524/24, 35, 45, 502, 503, 535
See application file for complete search history.

(56) References Cited

U.S. PATENT DOCUMENTS

| 5,360,419 A | 11/1994 | Chen et al. |
| 7,150,975 B2 * | 12/2006 | Tamada ............... A61B 5/1486 435/14 |
| 2002/0095864 A1 | 7/2002 | Obert et al. |
| 2003/0114059 A1 * | 6/2003 | Suzuki ............... D04H 13/002 442/118 |
| 2006/0188487 A1 | 8/2006 | Thomas et al. |
| 2008/0050436 A1 | 2/2008 | Chu |
| 2008/0236037 A1 | 10/2008 | Rose et al. |
| 2008/0294237 A1 | 11/2008 | Chu |
| 2010/0050506 A1 | 3/2010 | Huttermann |
| 2010/0139159 A1 | 6/2010 | Plate |
| 2010/0204800 A1 | 8/2010 | Thomas et al. |

FOREIGN PATENT DOCUMENTS

| CA | 2175732 | 11/1996 |
| CA | 2829340 | 9/2012 |
| CA | 2839535 | 7/2014 |
| CN | 101433503 | 5/2009 |
| EP | 1803442 | 7/2007 |
| JP | 4989884 | 8/1974 |
| JP | 363-207844 | 8/1988 |
| JP | 63280001 | 11/1988 |
| JP | 2001-152131 | 6/2001 |
| JP | 2005097408 | 4/2005 |
| JP | 2005-264046 | 9/2005 |
| JP | 2007-112757 | 5/2007 |
| JP | 20071112972 | 5/2007 |
| JP | 2007-146000 | 6/2007 |
| JP | 2008-511699 | 4/2008 |
| JP | 2008247807 | 10/2008 |
| WO | 99/08691 | 2/1999 |
| WO | 03/002075 | 1/2003 |
| WO | 2007/002705 A2 | 1/2007 |

OTHER PUBLICATIONS

International Preliminary Report on Patentability for corresponding PCT Application PCT/US2011/059837.
Sakai, Enzymatically crosslinked carboxymethylcellulose-tyramine conjugate hydrogel: Cellular adhesiveness and feasibility for cell sheet technology, Acta Biomaterialia 5 (2009) 554-559.

* cited by examiner

*Primary Examiner* — Edward Cain
(74) *Attorney, Agent, or Firm* — Palmer IP Inc.

(57) ABSTRACT

Gels and gel-containing materials, including hydrogels, are described. A gel can be formed by blending polyacrylic acid (PAA) and a polyglycol, such as polytetramethylene ether glycol (PTMEG) at room temperature and, in some cases, without using a catalyst. The blend material can be used to form soft or hard materials, films and particles. The blend material can be combined with vinyl monomers and polymerize to form a hydrogel. The hydrogel can have a high mechanical strength and high water absorbency.

33 Claims, 9 Drawing Sheets

(a) A DSC trace showing $T_m$ of PTMEG at about 13°C.

(b) A DSC trace showing $T_m$ of the PAA-PTMEG polymer blend at about 74°C.

A DSC trace showing $T_m$ of the blend of polyethylene with the PAA-PTMEG gel at 124°C. The $T_m$ of polyethylene by itself is about 105°C.

$T_m$

GELS AND HYDROGELS

CROSS-REFERENCE

This application claims priority to U.S. Provisional Patent Application No. 61/411,462, filed Nov. 8, 2010, and U.S. Provisional Patent Application No. 61/412,780, filed Nov. 11, 2010, both of which are incorporated herein by reference in their entireties.

BACKGROUND OF THE INVENTION

Polymeric gels and hydrophilic hydrogels having three-dimensional structure can have many important applications as matrices for use in biomedical, pharmaceutical, agriculture, biotechnology and industrial composite fields. These polymeric gels and hydrogels can have a three-dimensional ("3D") structure due to cross-linking; the cross-linked materials might be insoluble in organic solvents and water.

Polymeric gels and hydrogels can be produced by the polymerization of monomers or multifunctional monomers with cross-linkers with the aid of one or more catalysts, sometimes at high temperatures. This can lead to high materials costs and processing costs.

SUMMARY OF THE INVENTION

In an aspect of the invention, a hydrogel comprises a first polymeric material having polyacrylic acid, a second polymeric material having a polyglycol other than polyethylene glycol, and one or more species having a vinyl functionality. In an embodiment, the first polymeric material is substantially a homopolymer. In another embodiment, the second polymeric material is substantially a homopolymer. In another embodiment, the first polymeric material is hydrogen-bonded to the second polymeric material. In another embodiment, the polyglycol is polytetramethylene ether glycol. In another embodiment, at least one of the species having a vinyl functionality is acrylamide. In another embodiment, at least one of the species having a vinyl functionality can be acrylic acid, methylacrylic acid, vinyl alcohol, vinyl acetate, butyl acrylate, vinyl acrylate, vinylbenzoic acid, vinylbenzyl alcohol, vinylboronic acid dibutyl ester, vinylformamide, vinyl methacrylate, vinylpyridine, 1-vinyl-2-pyrrolidone, vinylsulfonic acid or vinyltrimethoxysilane. In another embodiment, the species having a vinyl functionality is substantially polymeric. In another embodiment, the hydrogel further comprises a cross-linker. In another embodiment, the cross-linker can be di(ethyleneglycol)divinyl ether, di(ethylglycol)diacrylate or N,N'-methylene bis(acrylamide). In another embodiment, the species having a vinyl functionality is covalently bonded to the first polymeric material. In another embodiment, the hydrogel remains substantially unchanged after one, or two, or 50 hydration-dehydration cycles. In another embodiment, the hydrogel has a water-retention capacity of at least about 10 times or at least about 50 times the weight of the hydrogel. In another embodiment, the hydrogel has a water-retention capacity of at least about 10%, or 20%, or 100%, or 1000% the weight of the hydrogel. In another embodiment, the ratio, by weight, of the first polymeric material to the second polymeric material is about 1-to-3, or about 1-to-6. In another embodiment, the polyacrylic acid is obtained from recycled polyacrylic acid. In another embodiment, the hydrogel further comprises a cellulose, gelatin, and/or clay. In another embodiment, the cellulose includes carboxymethyl cellulose. In another embodiment, hydrogel exhibits a tensile strength of about 1000 g/cm$^2$ to about 4000 g/cm$^2$, or of about 2000 g/cm$^2$ to about 3000 g/cm$^2$. In another embodiment, the hydrogel exhibits an impact strength of about 1000 g/cm$^2$ to about 4000 g/cm$^2$, or of about 2000 g/cm$^2$ to about 3000 g/cm$^2$. In another embodiment, the hydrogel further comprises fertilizer, silica, polyethylene, or polystyrene. In another embodiment, the $M_w$ (g/mol) of the first polymeric material is from about 250,000 to about 1,000,000, or between about 400,000 and 600,000. In another embodiment, the $M_w$ (g/mol) of the second polymeric material is from about 650 to about 2,000, or between about 500 and 1000.

In another aspect of the invention, a method for forming a hydrogel is provided, the method comprising providing, in a reaction vessel, a first polymeric material having polyacrylic acid, a second polymeric material having a polyglycol other than polyethylene glycol, and one or more species having a vinyl functionality, and mixing the first polymeric material, the second polymeric material and the one or more species having a vinyl functionality. In an embodiment, the first polymeric material is substantially a homopolymer. In another embodiment, the second polymeric material is substantially a homopolymer. In another embodiment, the first polymeric material and the second polymeric material are provided in a 1-to-3 ratio by weight, or a 1-to-6 ratio by weight, respectively. In another embodiment, the mixture of the first polymeric material, the second polymeric material and the one or more species having a vinyl functionality is heated. In another embodiment, the first polymeric material, second polymeric material and at least one of the species having a vinyl functionality are mixed at a temperature between about 15° C. and 30° C. In another embodiment, at least one of the species having a vinyl functionality is acrylamide, acrylic acid, methylacrylic acid, vinyl alcohol, vinyl acetate, butyl acrylate, vinyl acrylate, vinylbenzoic acid, vinylbenzyl alcohol, vinylboronic acid dibutyl ester, vinylformamide, vinyl methacrylate, vinylpyridine, 1-vinyl-2-pyrrolidone, vinylsulfonic acid or vinyltrimethoxysilane. In another embodiment, the polyacrylic acid is obtained from recycled polyacrylic acid.

In another aspect of the invention, a gel comprising a first polymeric material having polyacrylic acid, a second polymeric material having a polyglycol other than polyethylene glycol, where the first polymeric material is hydrogen-bonded to the second polymeric material, is provided. In another embodiment, the polyglycol is polytetramethylene ether glycol. In another embodiment, the first polymeric material is substantially a homopolymer. In another embodiment, the second polymeric material is substantially a homopolymer. In another embodiment, the ratio, by weight, of the first polymeric material to the second polymeric material is about 1-to-3, or about 1-to-6. In another embodiment, the $M_w$ (g/mol) of the first polymeric material is from about 250,000 to about 1,000,000, or between about 400,000 and 600,000. In another embodiment, the $M_w$ (g/mol) of the second polymeric material is from about 650 to about 2,000, or between about 500 and 1000. In another embodiment, a hydrogel comprising the gel is provided. In another embodiment, the hydrogel has a water-retention capacity of at least about 10 times, or about 50 times, the weight of the hydrogel. In another embodiment, the hydrogel has a water-retention capacity of at least about 10%, or 20%, or 100%, or 1000% the weight of the hydrogel. In another embodiment, the hydrogel remains substantially unchanged after one, or two, or 50 hydration-dehydration cycles. In another embodiment, the hydrogel further comprises a fertilizer, silica, polyethylene, or polystyrene. In another embodiment, the hydrogel further comprises one or more of a cellulose, gelatin and/or clay. In another embodiment, the cellulose includes carboxymethyl cellulose. In another embodiment, the polyacrylic acid is obtained from recycled polyacrylic acid. In another embodiment, the hydrogel exhibits a tensile strength of about 1000 g/cm$^2$ to about 4000 g/cm$^2$, or of about 2000 g/cm$^2$ to about 3000 g/cm$^2$. In another embodiment, the hydrogel exhibits an impact strength of about 1000 g/cm$^2$ to about 4000 g/cm$^2$, or of about 2000 g/cm$^2$ to about 3000 g/cm$^2$.

In another aspect of the invention, a method for forming a gel comprising mixing a first polymeric material and a second polymeric material to induce hydrogen bonding between the first polymeric material and the second polymeric material, where the first polymeric material comprises polyacrylic acid and the second polymeric material comprises a polyglycol other than polyethylene glycol, is provided. In another embodiment, the first polymeric material is substantially a homopolymer. In another embodiment, the second polymeric material is substantially a homopolymer. In another embodiment, the first and second polymeric materials are mixed at a temperature between about 15° C. and 30° C. In another embodiment, the gel is formed without the use of a catalyst. In another embodiment, the polyglycol is polytetramethylene ether glycol. In another embodiment, the first polymeric material and the second polymeric material are mixed in a ratio, by weight, of about 1-to-3, or about 1-to-6. In another embodiment, the polyacrylic acid is obtained from recycled polyacrylic acid. In another embodiment, the gel exhibits a tensile strength of about 1000 g/cm$^2$ to about 4000 g/cm$^2$, or of about 2000 g/cm$^2$ to about 3000 g/cm$^2$. In another embodiment, the gel exhibits an impact strength of about 1000 g/cm$^2$ to about 4000 g/cm$^2$, or of about 2000 g/cm$^2$ to about 3000 g/cm$^2$.

In another aspect of the invention, an agricultural method comprises providing a hydrogel in a plot of soil, the hydrogel comprising a first polymeric material hydrogen bonded to a second polymeric material, where the first polymeric material includes polyacrylic acid and the second polymeric material includes a polyglycol other than polyethylene glycol. In an embodiment, the second polymeric material is polytetramethylene ether glycol. In another embodiment, the first polymeric material is substantially a homopolymer. In another embodiment, the second polymeric material is substantially a homopolymer. In another embodiment, the hydrogel remains substantially unchanged after one, or two, or 50 hydration-dehydration cycles. In another embodiment, the hydrogel has a water-retention capacity of at least about 10 times, or about 50 times, the weight of the hydrogel. In another embodiment, the hydrogel has a water-retention capacity of at least about 10% the weight of the hydrogel. In another embodiments, the hydrogel has a water-retention capacity of at least about 20%, or 100%, or 1000% the weight of the hydrogel. In another embodiment, the ratio, by weight, of the first polymeric material to the second polymeric material is about 1-to-3, or about 1-to-6. In another embodiment, the hydrogel further comprises a cross-linker. In another embodiment, the hydrogel is formed without a catalyst. In another embodiment, the M$_w$ (g/mol) of the first polymeric material is from about 250,000 to about 1,000,000, or between about 400,000 and 600,000. In another embodiment, the M$_w$ (g/mol) of the second polymeric material is from about 500 to about 2,000, or between about 650 and 1,000. In another embodiment, the polyacrylic acid is obtained from recycled polyacrylic acid.

In another aspect of the invention, a system configured to grow a seed in an arid environment comprises a seed container formed of a first polymeric material having polyacrylic acid that is hydrogen bonded to a second polymeric material having a polyglycol, and a seed in the seed container. In an embodiment, the polyglycol is polytetramethylene ether glycol. In another embodiment, the first polymeric material is substantially a homopolymer. In another embodiment, the second polymeric material is substantially a homopolymer. In another embodiment, the ratio, by weight, of the first polymeric material to the second polymeric material is about 1-to-3, or about 1-to-6. In another embodiment, the first polymeric material has an M$_w$ (g/mol) from about 250,000 to about 1,000,000, or between about 400,000 and 600,000. In another embodiment, the second polymeric material has an M$_w$ (g/mol) from about 500 to about 2,000, or between about 650 and 1,000. In another embodiment, a method for growing a plant comprising providing, in a plot of soil, a seed configured to grow in an arid environment, the seed further comprising a seed container formed of a first polymeric material having polyacrylic acid that is hydrogen bonded to a second polymeric material having a polyglycol, and a seed in the seed container, is provided. In another embodiment, the seed yields a plant comprising a leaf having at least twice, or three times, or five times, or ten times the mass than a leaf yielded by a seed lacking the seed container. In another embodiment, the seed yields a plant comprising a root having at least twice, or three times, or five times, or ten times the mass than a root yielded by a seed lacking the seed container.

In another aspect of the invention, a plot of soil comprises soil and a hydrogel in the soil, the hydrogel having a first polymeric material having polyacrylic acid that is hydrogen bonded to a second polymeric material having a polyglycol. In an embodiment, the polyglycol is polytetramethylene ether glycol. In another embodiment, the first polymeric material is substantially a homopolymer. In another embodiment, the second polymeric material is substantially a homopolymer. In another embodiment, the ratio, by weight, of the first polymeric material to the second polymeric material is about 1-to-3, or about 1-to-6. In another embodiment, the M$_w$ of the first polymeric material is from about 250,000 to about 1,000,000, or between about 400,000 and 600,000. In another embodiment, the M$_w$ of the second polymeric material is from about 500 to about 2,000, or between about 650 and 1,000. In another embodiment, the hydrogel remains substantially unchanged after one, or two, or 50 hydration-dehydration cycles. In another embodiment, the hydrogel has a water-retention capacity of at least about 10 times, or 50 times, the weight of the hydrogel. In another embodiment, the hydrogel has a water-retention capacity of at least about 10%, or about 20%, or about 100%, or about 1000% the weight of the hydrogel. In another embodiment, the hydrogel further comprises a species having a vinyl functionality. In another embodiment, the species having the vinyl functionality can be acrylamide, acrylic acid, methylacrylic acid, vinyl alcohol, vinyl acetate, butyl acrylate, vinyl acrylate, vinylbenzoic acid, vinylbenzyl alcohol, vinylboronic acid dibutyl ester, vinylformamide, vinyl methacrylate, vinylpyridine, 1-vinyl-2-pyrrolidone, vinylsulfonic acid or vinyltrimethoxysilane. In another embodiment, the species having the vinyl functionality is polymeric. In another embodiment, the species having the vinyl functionality is covalently bonded to the first polymeric material. In another embodiment, the polyacrylic acid is obtained from recycled polyacrylic acid.

In another aspect of the invention, a gel comprising polyacrylic acid and a polyglycol other than polyethylene glycol, where the polyacrylic acid is hydrogen bonded to the polyglycol, is provided. In an embodiment, the polyglycol is polytetramethylene ether glycol. In another embodiment, the first polymeric material is substantially a homopolymer. In another embodiment, the second polymeric material is substantially a homopolymer. In another embodiment, the ratio, by weight, of the first polymeric material to the second polymeric material is about 1-to-3, or about 1-to-6. In another embodiment, the $M_w$ (g/mol) of the first polymeric material is from about 250,000 to about 1,000,000, or between about 400,000 and 600,000. In another embodiment, the $M_w$ (g/mol) of the second polymeric material is from about 650 to about 2,000, or between about 500 and 1000. In another embodiment, a hydrogel comprises the gel comprising polyacrylic acid and a polyglycol other than polyethylene glycol, where the polyacrylic acid is hydrogen bonded to the polyglycol.

In another aspect of the invention, an environmentally-friendly hydrogel comprises a polyacrylic acid homopolymer hydrogen bonded to an additional homopolymer having an environmentally friendly polyglycol.

In another aspect of the invention, a method for forming an environmentally-friendly hydrogel comprises mixing a polyacrylic acid homopolymer with an additional homopolymer having an environmentally friendly polyglycol. The polyacrylic acid homopolymer forms hydrogen bonding interactions with the additional homopolymer.

In another aspect of the invention, an environmentally-friendly hydrogel comprises a first polymeric material having polyacrylic acid that is hydrogen bonded to a second polymeric material having an environmentally friendly polyglycol.

In another aspect of the invention, a method for forming an environmentally-friendly hydrogel comprises mixing a first polymeric material having polyacrylic acid with a second polymeric material having an environmentally friendly polyglycol to form a polymer mixture, where upon mixing the polyacrylic acid forms hydrogen bonding interactions with the environmentally friendly polyglycol.

In another aspect of the invention, an environmentally-friendly hydrogel, comprising a first polymeric material having polyacrylic acid, a second polymeric material having a polyglycol, the first polymeric material having hydrogen bonding interactions with said second polymeric material, and one or more environmentally-friendly polymers, is provided.

In another aspect of the invention, a method for forming an environmentally-friendly hydrogel, comprising providing, in a reaction vessel, a first polymeric material having polyacrylic acid, a second polymeric material having a polyglycol, and one or more environmentally-friendly polymers, and mixing the first polymeric material having polyacrylic acid, the second polymeric material having a polyglycol, and one or more environmentally-friendly polymers, is provided.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
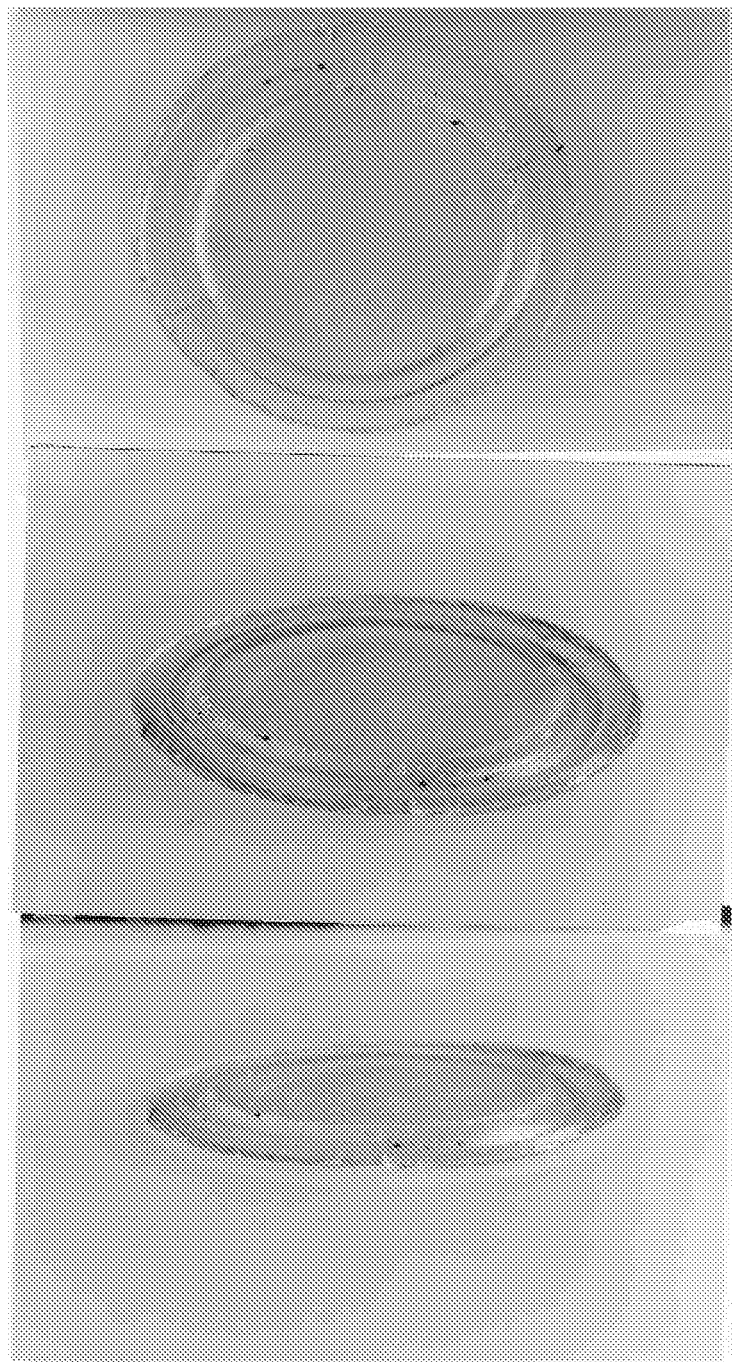
FIG. 1 shows a three-dimensional ("3D") gel formed in a model, in accordance with an embodiment of the invention.

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein can be employed in practicing the invention.

The term "polymeric material," as used herein, includes a material having one or more monomeric subunits (also "units" herein). In an embodiment, a polymeric material can include one or more types of repeating subunits. In another embodiment, a polymeric material can include the same type of repeating subunit. In another embodiment, a polymeric material can include two or more different types of repeating subunits. In another embodiment, a polymeric material can include monomeric subunits bonded to one another. In another embodiment, a polymeric material can include monomeric subunits bonded to another with the aid of covalent bonds.

The term "gel," as used herein, can include a material comprising one or more types of polymeric materials bonded together. In an embodiment, a gel (also "polymeric gel" herein) can include one or more types of polymeric materials bonded together to form a three-dimensional structure. In another embodiment, a gel can include two types of polymeric materials bonded together to form a three-dimensional structure (or three-dimensional network). In another embodiment, a gel can include one or more types of polymeric materials bonded to one another with the aid of hydrogen bonds. In another embodiment, a gel can include one or more types of polymeric materials bonded to one another solely with the aid of hydrogen bonds. In another embodiment, a first polymeric material having one or more monomeric subunits is hydrogen-bonded to a second polymeric material having one or more monomeric subunits. In another embodiment, the hydrogen bonds are formed between hydrogen atoms of a first polymeric material and electronegative atoms (e.g., oxygen, nitrogen or fluorine).

The term "hydrogel" (also referred to as "aquagel"), as used herein, is any substance that is configured to retain water. A hydrogel can include hydrophilic moieties, i.e., groups or subgroups that can have an attractive interaction with one or more water molecules. Hydrogels formed according to methods described herein can have water retention capabilities equal to or exceeding those of current hydrogels.

The term "homopolymer," as used herein, is any polymeric substance that is composed of the same kind of a monomer. For example, homopolymer of acrylic acid is a polymer that is composed only of acrylic acid. The phrase "substantially a homopolymer," as used herein, refers to a polymeric material that is composed of about 80%, or about 81%, or about 82%, or about 83%, or about 84%, or about 85%, or about 86%, or about 87%, or about 88%, or about 89%, or about 90%, or about 91%, or about 92%, or about 93%, or about 94%, or about 95%, or about 96%, or about 97%, or about 98%, or about 99%, or about 99.5%, or about 99.9%, or about 99.95%, of the same kind of monomer unit. For example, when a material having polyacrylic acid is substantially a homopolymer, at least 80% of the material is composed of acrylic acid monomer units. For another example, when a material having a polyglycol is substantially a homopolymer, at least 80% of the material is composed of the same glycol monomer units. For example, when a polymeric material having polytetramethylene ether glycol ("PTMEG") is substantially a homopolymer, it is composed of at least 80% of polytetramethylene ether glycol monomer units.

The phrase "substantially unchanged," as used herein, refers to gels or hydrogels that exhibit about the same mass after a hydration-dehydration cycle as before a hydration-dehydration cycle.

The above gel or hydrogel materials can be further blended with other materials, such as, e.g., polyethylene or polystyrene to form polymeric composites with high tensile and impact strength.

Provided herein are gels and hydrogels that can be used in various applications, such as water retention systems for agricultural purposes. Gels and hydrogels provided herein are based at least in part on the unexpected realization that the combination of certain components, as provided herein, can lead to the formation of gels and hydrogels with properties that are suited for such applications, such as high water retention capacities. For example, a gel having polyacrylic acid and polytetramethylene ether glycol is environmentally friendly and does not lead to environmental contamination during extended use. In some situations, such gels and hydrogels are readily formed at temperatures at or near room temperature without the application of heat and, in some cases, without the aid of a catalyst, thereby minimizing processing costs and, ultimately, emissions that may lead to global warming.

In various embodiments, compositions and methods are disclosed for producing gels without the need for catalysts. In some embodiments, gels can be produced at room temperature (i.e., at a temperature between about 15° C. and 30° C.), enabling savings in processing costs. In other embodiments, gels are not appreciably soluble in organic solvents or water.

In some embodiments, two polymeric materials form a polymeric gel (also "gel" herein), which can be a soft but tough material. The gel can have a viscosity at least similar to the viscosity of rubber or rubber-like materials. In some cases, gels may have viscosities greater than about $10^3$ Pa·s, or $10^4$ Pa·s, or $10^5$ Pa·s, or $10^6$ Pa·s, or $10^7$ Pa·s, or $10^8$ Pa·s, or $10^9$ Pa·s, or $10^{10}$ Pa·s, or $10^{11}$ Pa·s, or $10^{12}$ Pa·s. In an embodiment, the gel can be produced at room temperature without the use of a catalyst and without the production of any byproducts.

In some embodiments, compositions and methods are disclosed for producing hydrogels. The hydrogels can be formed from gels provided herein, which can include a single strand of a first polymeric material, such as PAA, that is hydrogen bonded to a single strand of a second polymeric material, such as PTMEG.

Using the above polymeric gel as the skeleton, hydrophilic hydrogels can be formed by mixing certain hydrophilic monomers with two types of polymeric materials, such as polyacrylic acid (also "PAA" therein) and polyglycols, and polymerization of other monomers, such as vinyl-group containing monomers, in situ.

The above hydrogel materials can be blended with materials such as fertilizer or soil to provide blend materials with improved water-retention capabilities.

Gels and Hydrogels

In an aspect of the invention, a gel (also "gel-like substance" herein), is provided. In an embodiment, a three-dimensional ("3D") gel is provided. The three-dimensional gel can comprise two or more polymeric materials. In some cases, a gel includes two or more polymeric materials that are hydrogen bonded to one another. The polymeric materials can be hydrogen bonded to one another through one or more subunits of the polymeric materials.

In some embodiments, a gel includes 1 or more, 2 or more, 3 or more, 4 or more, 5 or more, 6 or more, 7 or more, 8 or more, 9 or more, or 10 or more types of polymeric materials that are hydrogen bonded to one another.

In some examples, a gel is provided having a first polymeric material and a second polymeric material. In an embodiment, the first polymeric material is cross-linked to the second polymeric material. In another embodiment, the first polymeric material is hydrogen-bonded to the second polymeric material. In another embodiment, the first polymeric material is linked to the second polymeric material exclusively through hydrogen-bonding interactions. In another embodiment, the first polymeric material is linear polyacrylic acid ("PAA") and the second polymeric material is a polyglycol. In another embodiment, the first polymeric material is PAA and the second polymeric material is polytetramethylene ether glycol ("PTMEG"). In some embodiments, the gel includes a third polymeric material. In an embodiment, the third polymeric material is hydrogen-bonded to the second polymeric material. In another embodiment, the third polymeric material is hydrogen-bonded to the first polymeric material. In another embodiment, the third polymeric material is hydrogen-bonded to the first and second polymeric materials. In another embodiment, the first polymeric material is PAA, the second polymeric material is a polyglycol, and the third polymeric material is polyacrylamide ("PAM"). In another embodiment, the first polymeric material is PAA, the second polymeric material is PTMEG, and the third polymeric material is PAM. In another embodiment, the first polymeric material is PAA, the second polymeric material is PTMEG, and the third polymeric material is polyvinyl alcohol. In another embodiment, the third polymeric material is covalently bonded to the first polymeric material.

In some embodiments, PAA can be obtained from recycled polyacrylic acid, such as polyacrylic acid extracted from used diapers. In some cases, additional processing may be necessary to prepare the recycled polyacrylic acid for use with gels and hydrogels provided herein.

In an embodiment, a gel comprises polyacrylic acid (or poly(acrylic acid), "PAA") and a polyglycol. In some embodiments, a gel further comprises the monomer of acrylic acid. In some embodiments, a gel comprises a vinyl-containing monomer (also referred to as "vinyl-containing material" herein), including acrylamide, methylacrylic acid, vinyl alcohol, vinyl acetate, butyl acrylate, vinyl acrylate, vinylbenzoic acid, vinylbenzyl alcohol, vinylboronic acid dibutyl ester, vinylformamide, vinyl methacrylate, vinylpyridine, 1-vinyl-2-pyrrolidone, vinylsulfonic acid and vinyltrimethoxysilane. In some embodiments, a gel comprises a vinyl-containing polymer (also referred to as "vinyl-containing material" herein). When a vinyl-containing material is an acid, a gel may comprise a salt derivative of the acid. For example, when the monomer is acrylic acid, a gel may comprise a sodium or potassium salt of acrylic acid, or a sodium or potassium salt of polyacrylic acid. In some embodiments, the vinyl-containing material is covalently bonded to polyacrylic acid.

In an embodiment, a gel comprises poly(acrylic acid) ("PAA") and one or more polyglycols, the one or more polyglycols selected from polyethylene glycol (PEG), polytetramethylene ether glycol (PTMEG), and polypropylene ether glycol (PPG). PPG, while providing a polymeric gel of desirable high softness, is infrequently used in applications intended for medical use because PPG requires a catalyst for reaction with isocyanates. In another embodiment, a gel comprises PAA and PEG. In another embodiment, a gel comprises PAA and PTMEG. In another embodiment, a gel comprises PAA and PPG.

In an embodiment, a gel, including a hydrogel, comprises a first polymeric material and a second polymeric material, the second polymeric material having —O—$(CH_2)_n$— subunits, wherein 'n' is a number greater than or equal to 2, or 3, or 4, or 5, or 6, or 7, or 8, or 9, or 10, or 11, or 12, or 13, or 14, or 15, or 16, or 17, or 18, or 19, or 20. In another embodiment, 'n' is greater than or equal to 2. In another embodiment, 'n' is greater than or equal to 3. In another embodiment, 'n' is greater than or equal to 4. In such a case, the second polymeric material can be PTMEG. In another embodiment, the gel can include a third polymeric material. In another embodiment, the gel can include hydrogen-bonding interactions between polymeric materials.

In an embodiment, a gel comprises a first polymeric material and a second polymeric material, the second polymeric material having —O—$(CH_2CH_2)_m$— subunits, wherein 'm' is a number greater than or equal to 1, or 2, or 3, or 4, or 5, or 6, or 7, or 8, or 9, or 10, or 11, or 12, or 13, or 14, or 15, or 16, or 17, or 18, or 19, or 20. In another embodiment, 'm' is greater than or equal to 2. In such a case, the second polymeric material can be PTMEG. In another embodiment, 'm' is greater than or equal to 3. In another embodiment, 'm' is greater than or equal to 4. In an example, the first polymeric material can include a polymeric material that is hydrogen bonded to the second polymeric material. In some embodiments, the first polymeric material can include PAA. In another embodiment, the gel can include hydrogen-bonding interactions between polymeric materials.

In an embodiment, a three-dimensional gel structure can be formed by mixing polyacrylic acid and a polyglycol, thereby providing a material where the two components interact through their hydrogen bonds only. In some cases, a gel is formed by heating a mixture having polyacrylic acid and the polyglycol. The properties of the mixed material are different from the starting materials. The linear polyacrylic acid is a powder, and the polyglycol is a viscous liquid at room temperature. In an embodiment, the mixed material is a rubber-like solid (i.e., having a viscosity similar to rubber or rubber-like materials). In another embodiment, the mixed material cannot be appreciably dissolved in any solvents, either organic solvents or water.

In an embodiment, a gel comprises polyacrylic acid (PAA) and a polyglycol having average molecular weights selected to provide gel properties as desired. In another embodiment, a gel comprises PAA and PTMEG having average molecular weights selected to provide gel properties as desired.

In some embodiments, a gel comprises PAA having an average molecular weight ($M_w$) between about 1,800 to about 4,000,000 (g/mol). In an embodiment, a gel comprises a polyglycol having an average molecular weight ($M_w$) of at least about 250, or at least about 650, or at least about 1000, or at least about 2000, or at least about 3000.

In some embodiments, the ratio, by weight, of the first polymeric material to the second polymeric material is about 1-to-1, or about 1-to-2, or about 1-to-3, or about 1-to-6, or about 1-10, or about 1-20, or about 2-to-1, or about 3-to-1, or about 4-to-1, or about 5-to-1, or about 6-to-1, or about 10-to-1, or about 20-to-1, or more.

In some embodiments, a gel comprising a first polymeric material and a second polymeric material is blended with polyethylene. In some embodiments, the blend of polyethylene and a gel comprising a first polymeric material and a second polymeric material exhibits an impact strength higher than that of the polyethylene by itself. In some embodiments, the blend of polyethylene and a gel comprising a first polymeric material and a second polymeric material exhibits a tensile strength higher than that of the polyethylene by itself.

Environmentally Friendly Gels and Hydrogels

In an aspect of the invention, environmentally friendly gels and hydrogels are provided. Environmentally friendly gels and hydrogels may be non-toxic and/or biodegradable. Non-toxic and biodegradable hydrogels can be prepared by using a first polymeric material, such as polyacrylic acid, and a second polymeric material, such as an environmentally friendly polyglycol. Such non-toxic and biodegradable hydrogels can be friendly to the environment (also referred to as "environmentally-friendly hydrogels" herein), as they minimize, if not eliminate, the production of hazardous components, thereby minimizing, if not eliminating, the risk of hazardous components from entering (or leaching into) water supplies, for example. In some embodiments, the environmentally friendly polyglycol is polytetramethylene ether glycol (PTMEG). In some embodiments, the first polymeric material is substantially a homopolymer. In some embodiments, the environmentally friendly polyglycol is a homopolymer. In some embodiments, the first polymeric material, such as polyacrylic acid, is hydrogen-bonded to the environmentally friendly polyglycol. In some embodiments, an environmentally friendly polyglycol excludes polyethylene glycol.

In some embodiments, an environmentally friendly hydrogel is blended with polyethylene. A blend of an environmentally friendly hydrogel and polyethylene can exhibit higher impact strength than that of the polyethylene by itself. In some cases, a blend of an environmentally friendly hydrogel and polyethylene can exhibit higher tensile strength than that of the polyethylene by itself.

In some embodiments, an environmentally friendly hydrogel exhibits properties as described for gels and hydrogels below. In some embodiments, an environmentally friendly hydrogel can be further combined with an environmentally friendly polymer that is not a polyglycol as described below, such as cellulose. In some embodiments, an environmentally friendly hydrogel is formed by the methods described below. In some embodiments, an environmentally friendly hydrogel has a composition as described above. In some embodiments, an environmentally friendly hydrogel is blended with a material such as fertilizer or soil to provide a blend material with high water-retention capacity.

An environmentally friendly hydrogel comprising an environmentally friendly polyglycol can be advantageous over hydrogels that comprise toxic polyglycols in that a wider range of uses may be available for hydrogels that do not contain toxic materials. For example, an environmentally friendly hydrogel can be used in agricultural or medical applications, or combined with environmentally friendly polymers to provide a blend that is compatible with uses in medicine and agriculture. Further applications of environmentally friendly hydrogels are described.

Methods for Forming Gels and Hydrogels

In another aspect of the invention, methods for forming gels (also "gel-like substances" herein), including three-dimensional ("3D") gels, are provided. In an embodiment, a first process is used to form a first polymeric material and a second process is used to form a second polymeric material. The first and second polymeric materials are mixed together to form a gel. The polymeric materials can be mixed in a reaction vessel or chamber, such as, for example, a beaker, tub, tank or vat. In some cases, the polymeric material can be added to the reaction vessel under continuous stirring conditions.

In an embodiment, a method for forming a gel or gel-like substance includes combining a first polymeric material and a second polymeric material to form a gel having the first polymeric material bonded to the second polymeric material via hydrogen bonds between subunits of the first and second polymeric materials.

In an embodiment, a gel is formed by mixing a first polymeric material having PAA with a second polymeric material having a polyglycol (e.g., PEG, PTMEG, PPG) at room temperature. In some cases, the second polymeric material excludes polyethylene glycol. In another embodiment, a gel is formed by mixing a first polymeric material having PAA with a second polymeric material having a polyglycol (e.g., PEG, PTMEG, PPG) at a temperature between about 15° C. and 35° C., or 15° C. and 30° C., or 20° C. and 30° C., or 22° C. and 27° C. In another embodiment, a gel is formed by mixing a first polymeric material having PAA with a second polymeric material having a polyglycol at a temperature of about 15.0° C., or 15.1° C., or 15.2° C., or 15.3° C., or 15.4° C., or 15.5° C., or 15.6° C., or 15.7° C., or 15.8° C., or 15.9° C., or 16.0° C., or 16.1° C., or 16.2° C., or 16.3° C., or 16.4° C., or 16.5° C., or 16.6° C., or 16.7° C., or 16.8° C., or 16.9° C., or 17.0° C., or 17.1° C., or 17.2° C., or 17.3° C., or 17.4° C., or 17.5° C., or 17.6° C., or 17.7° C., or 17.8° C., or 17.9° C., or 18.0° C., or 18.1° C., or 18.2° C., or 18.3° C., or 18.4° C., or 18.5° C., or 18.6° C., or 18.7° C., or 18.8° C., or 18.9° C., or 19.0° C., or 19.1° C., or 19.2° C., or 19.3° C., or 19.4° C., or 19.5° C., or 19.6° C., or 19.7° C., or 19.8° C., or 19.9° C., or 20.0° C., or 20.1° C., or 20.2° C., or 20.3° C., or 20.4° C., or 20.5° C., or 20.6° C., or 20.7° C., or 20.8° C., or 20.9° C., or 21.0° C., or 21.1° C., or 21.2° C., or 21.3° C., or 21.4° C., or 21.5° C., or 21.6° C., or 21.7° C., or 21.8° C., or 21.9° C., or 22.0° C., or 22.1° C., or 22.2° C., or 22.3° C., or 22.4° C., or 22.5° C., or 22.6° C., or 22.7° C., or 22.8° C., or 22.9° C., or 23.0° C., or 23.1° C., or 23.2° C., or 23.3° C., or 23.4° C., or 23.5° C., or 23.6° C., or 23.7° C., or 23.8° C., or 23.9° C., or 24.0° C., or 24.1° C., or 24.2° C., or 24.3° C., or 24.4° C., or 24.5° C., or 24.6° C., or 24.7° C., or 24.8° C., or 24.9° C., or 25.0° C., or 25.1° C., or 25.2° C., or 25.3° C., or 25.4° C., or 25.5° C., or 25.6° C., or 25.7° C., or 25.8° C., or 25.9° C., or 26.0° C., or 26.1° C., or 26.2° C., or 26.3° C., or 26.4° C., or 26.5° C., or 26.6° C., or 26.7° C., or 26.8° C., or 26.9° C., or 27.0° C., or 27.1° C., or 27.2° C., or 27.3° C., or 27.4° C., or 27.5° C., or 27.6° C., or 27.7° C., or 27.8° C., or 27.9° C., or 28.0° C., or 28.1° C., or 28.2° C., or 28.3° C., or 28.4° C., or 28.5° C., or 28.6° C., or 28.7° C., or 28.8° C., or 28.9° C., or 29.0° C., or 29.1° C., or 29.2° C., or 29.3° C., or 29.4° C., or 29.5° C., or 29.6° C., or 29.7° C., or 29.8° C., or 29.9° C., or 30.0° C., or 31.0° C., or 31.1° C., or 31.2° C., or 31.3° C., or 31.4° C., or 31.5° C., or 31.6° C., or 31.7° C., or 31.8° C., or 31.9° C., or 32.0° C., or 32.1° C., or 32.2° C., or 32.3° C., or 32.4° C., or 32.5° C., or 32.6° C., or 32.7° C., or 32.8° C., or 32.9° C., or 33.0° C., or 33.1° C., or 33.2° C., or 33.3° C., or 33.4° C., or 33.5° C., or 33.6° C., or 33.7° C., or 33.8° C., or 33.9° C., or 34.0° C., or 34.1° C., or 34.2° C., or 34.3° C., or 34.4° C., or 34.5° C., or 34.6° C., or 34.7° C., or 34.8° C., or 34.9° C., or 35.0° C.

In an embodiment, a gel is formed by mixing a first polymeric material having PAA with a second polymeric material having one or more of PEG, PTMEG, and PPG at room temperature. In some cases, the second polymeric material excludes polyethylene glycol. In another embodiment, a gel is formed by mixing a first polymeric material having PAA with a second polymeric material having a polyglycol (e.g., PEG, PTMEG, PPG) at a temperature between about 15° C. and 35° C., or 15° C. and 30° C., or 20° C. and 30° C., or 22° C. and 27° C. In another embodiment, a gel is formed by mixing a first polymeric material having PAA with a second polymeric material having one or more of PEG, PTMEG, and PPG at a temperature of about 15.0° C., or 15.1° C., or 15.2° C., or 15.3° C., or 15.4° C., or 15.5° C., or 15.6° C., or 15.7° C., or 15.8° C., or 15.9° C., or 16.0° C., or 16.1° C., or 16.2° C., or 16.3° C., or 16.4° C., or 16.5° C., or 16.6° C., or 16.7° C., or 16.8° C., or 16.9° C., or 17.0° C., or 17.1° C., or 17.2° C., or 17.3° C., or 17.4° C., or 17.5° C., or 17.6° C., or 17.7° C., or 17.8° C., or 17.9° C., or 18.0° C., or 18.1° C., or 18.2° C., or 18.3° C., or 18.4° C., or 18.5° C., or 18.6° C., or 18.7° C., or 18.8° C., or 18.9° C., or 19.0° C., or 19.1° C., or 19.2° C., or 19.3° C., or 19.4° C., or 19.5° C., or 19.6° C., or 19.7° C., or 19.8° C., or 19.9° C., or 20.0° C., or 20.1° C., or 20.2° C., or 20.3° C., or 20.4° C., or 20.5° C., or 20.6° C., or 20.7° C., or 20.8° C., or 20.9° C., or 21.0° C., or 21.1° C., or 21.2° C., or 21.3° C., or 21.4° C., or 21.5° C., or 21.6° C., or 21.7° C., or 21.8° C., or 21.9° C., or 22.0° C., or 22.1° C., or 22.2° C., or 22.3° C., or 22.4° C., or 22.5° C., or 22.6° C., or 22.7° C., or 22.8° C., or 22.9° C., or 23.0° C., or 23.1° C., or 23.2° C., or 23.3° C., or 23.4° C., or 23.5° C., or 23.6° C., or 23.7° C., or 23.8° C., or 23.9° C., or 24.0° C., or 24.1° C., or 24.2° C., or 24.3° C., or 24.4° C., or 24.5° C., or 24.6° C., or 24.7° C., or 24.8° C., or 24.9° C., or 25.0° C., or 25.1° C., or 25.2° C., or 25.3° C., or 25.4° C., or 25.5° C., or 25.6° C., or 25.7° C., or 25.8° C., or 25.9° C., or 26.0° C., or 26.1° C., or 26.2° C., or 26.3° C., or 26.4° C., or 26.5° C., or 26.6° C., or 26.7° C., or 26.8° C., or 26.9° C., or 27.0° C., or 27.1° C., or 27.2° C., or 27.3° C., or 27.4° C., or 27.5° C., or 27.6° C., or 27.7° C., or 27.8° C., or 27.9° C., or 28.0° C., or 28.1° C., or 28.2° C., or 28.3° C., or 28.4° C., or 28.5° C., or 28.6° C., or 28.7° C., or 28.8° C., or 28.9° C., or 29.0° C., or 29.1° C., or 29.2° C., or 29.3° C., or 29.4° C., or 29.5° C., or 29.6° C., or 29.7° C., or 29.8° C., or 29.9° C., or 30.0° C., or 31.0° C., or 31.1° C., or 31.2° C., or 31.3° C., or 31.4° C., or 31.5° C., or 31.6° C., or 31.7° C., or 31.8° C., or 31.9° C., or 32.0° C., or 32.1° C., or 32.2° C., or 32.3° C., or 32.4° C., or 32.5° C., or 32.6° C., or 32.7° C., or 32.8° C., or 32.9° C., or 33.0° C., or 33.1° C., or 33.2° C., or 33.3° C., or 33.4° C., or 33.5° C., or 33.6° C., or 33.7° C., or 33.8° C., or 33.9° C., or 34.0° C., or 34.1° C., or 34.2° C., or 34.3° C., or 34.4° C., or 34.5° C., or 34.6° C., or 34.7° C., or 34.8° C., or 34.9° C., or 35.0° C. In another embodiment, a gel is formed by mixing a first polymeric material having PAA with a second polymeric material having one or more of PEG, PTMEG, and PPG at a temperature between about 25° C. to about 30° C.

In an embodiment, a gel-like substance is formed by mixing polyacrylic acid ("PAA") and polytetramethylene glycol ("PTMEG"), also known as poly(tetramethylene ether glycol). PTMEG can be used to form polyurethanes and other polymeric materials (also "polymers" herein) that have been approved for medical and dental uses, among others. In another embodiment, a gel-like substance is formed by combining a powder of polyacrylic acid (PAA) and a viscous solution of polyglycol to form a mixture, and continuously stirring the mixture at room temperature. In an embodiment, PAA and a polyglycol can be combined at a temperature between about 15° C. and 35° C. or 20° C. and 30° C. to form a gel without the use of a catalyst (e.g., heterogeneous or homogeneous catalyst). In an embodiment, a gel is formed without the use of a heterogeneous catalyst. In another embodiment, a gel is formed without the use of a homogenous catalyst.

In an embodiment, a gel is formed by mixing PAA with a polyglycol at a ratio (by weight) of about 0.1 to 1, or 0.2 to 1, or 0.3 to 1, or 0.4 to 1, or 0.5 to 1, or 0.6 to 1, or 0.7 to 1, or 0.8 to 1, or 0.9 to 1, or 1 to 1, or 1.1 to 1, or 1.2 to 1, or 1.3 to 1, or 1.4 to 1, or 1.5 to 1, or 1.6 to 1, or 1.7 to 1, or 1.8 to 1, or 1.9 to 1, or 2 to 1. In another embodiment, a gel is formed by mixing PAA with a polyglycol at a ratio of about 0.1 to 1, or 0.11 to 1, or 0.12 to 1, or 0.13 to 1, or 0.14 to 1, or 0.15 to 1, or 0.16 to 1, or 0.17 to 1, or 0.18 to 1, or 0.19 to 1, or 0.2 to 1, or 0.21 to 1, or 0.22 to 1, or 0.23 to 1, or 0.24 to 1, or 0.25 to 1, or 0.26 to 1, or 0.27 to 1, or 0.28 to 1, or 0.29 to 1, or 0.3 to 1, or 0.31 to 1, or 0.32 to 1, or 0.33 to 1, or 0.34 to 1, or 0.35 to 1, or 0.36 to 1, or 0.37 to 1, or 0.38 to 1, or 0.39 to 1, or 0.4 to 1, or 0.41 to 1, or 0.42 to 1, or 0.43 to 1, or 0.44 to 1, or 0.45 to 1, or 0.46 to 1, or 0.47 to 1, or 0.48 to 1, or 0.49 to 1, or 0.5 to 1.

In an embodiment, a gel is formed by mixing PAA with PTMEG (also "PTMG" herein) at a ratio (by weight) of about 0.1 to 1, or 0.2 to 1, or 0.3 to 1, or 0.4 to 1, or 0.5 to 1, or 0.6 to 1, or 0.7 to 1, or 0.8 to 1, or 0.9 to 1, or 1 to 1, or 1.1 to 1, or 1.2 to 1, or 1.3 to 1, or 1.4 to 1, or 1.5 to 1, or 1.6 to 1, or 1.7 to 1, or 1.8 to 1, or 1.9 to 1, or 2 to 1. In another embodiment, a gel is formed by mixing PAA with PTMEG at a ratio (by weight) of about 0.1 to 1, or 0.11 to 1, or 0.12 to 1, or 0.13 to 1, or 0.14 to 1, or 0.15 to 1, or 0.16 to 1, or 0.17 to 1, or 0.18 to 1, or 0.19 to 1, or 0.2 to 1, or 0.21 to 1, or 0.22 to 1, or 0.23 to 1, or 0.24 to 1, or 0.25 to 1, or 0.26 to 1, or 0.27 to 1, or 0.28 to 1, or 0.29 to 1, or 0.3 to 1, or 0.31 to 1, or 0.32 to 1, or 0.33 to 1, or 0.34 to 1, or 0.35 to 1, or 0.36 to 1, or 0.37 to 1, or 0.38 to 1, or 0.39 to 1, or 0.4 to 1, or 0.41 to 1, or 0.42 to 1, or 0.43 to 1, or 0.44 to 1, or 0.45 to 1, or 0.46 to 1, or 0.47 to 1, or 0.48 to 1, or 0.49 to 1, or 0.5 to 1. In another embodiment, a gel is formed by mixing PAA with PTMEG (also "PTMG" herein) at a ratio (by weight) of about 1 to 3 (PAA to PTMEG).

In an embodiment, upon mixing PAA and a polyglycol, a gel is formed having cross linkages between the PAA and polyglycol moieties of the gel—that is, cross linkages between the PAA polymer and the polyglycol polymer of the gel. The formation of cross linkages can depend on the formation of hydrogen bonds between the COOH group of polyacrylic acid and the —O—R—O— group of the polyglycol. In an embodiment, the formation of cross linkages can depend on the formation of hydrogen bonds between the COOH group of PAA and the —O—R—O— group of PTMEG.

In some cases, using PTMEG, block materials (e.g., soft or hard block materials), films and particles can be formed with high compressive and tensile strengths. In another embodiment, a blend material formed from polyacrylic acid and polytetramethylene glycol can also be prepared from one or both of an organic solvent system and aqueous system. See, for example, Examples 5 and 6.

With reference to FIG. 1, a three-dimensional ("3D") polymeric gel formed in mold is illustrated, in accordance with an embodiment of the invention. In another embodiment, a gel can be formed by mixing PAA and a polyglycol, such as PTMEG, or by letting the mixture set in a mold (or enclosure) having any shape and size, such as circular, triangular, square, rectangular, pentagonal, hexagonal, heptagonal or nonagonal. In some cases, the mixture is permitted to set for at least about 1 second, or at least about 2 seconds, or at least about 5 seconds, or at least about 10 seconds, or at least about 20 seconds, or at least about 30 seconds, or at least about 40 seconds, or at least about 50 seconds, or at least about 1 minute, or at least about 10 minutes, or at least about 30 minutes, or at least about 50 minutes, or at least about 1 hour, or at least about 5 hours, or at least about 24 hours, or at least about 2 days, or at least about 10 days, or at least about 20 days, or at least about a month, or longer.

In an embodiment, a gel is formed at room temperature (e.g., between about 15° C. and 35° C., or between about 20° C. and 30° C.) without adding any heat to a mixture of components of the gel. In another embodiment, a gel is formed by mixing PAA and a polyglycol at room temperature without adding heat to the mixture. In another embodiment, a gel is formed by mixing PAA and PTMEG at room temperature without adding heat to the mixture. This can advantageously enable savings in processing costs.

In an embodiment, a gel is formed at atmospheric or nearly atmospheric pressure. In another embodiment, a gel is formed by mixing PAA and a polyglycol at atmospheric or nearly atmospheric pressure. In another embodiment, a gel is formed by mixing PAA and PTMEG at atmospheric or nearly atmospheric pressure. This can advantageously preclude the use of high-pressure equipment, such as pressure chambers, compressors and pumps, thus providing for savings in processing costs. In an alternative embodiment, a gel is formed by mixing PAA and a polyglycol under vacuum conditions. In another embodiment, gel is formed by mixing PAA and PTMEG under vacuum conditions.

In an embodiment, at a temperature between about 15° C. and 35° C., or 20° C. and 30° C. and atmospheric or nearly atmospheric pressure, PAA can be a crystalline powder and PTMEG can be a viscous material, such as a soft wax (which can become a free-flowing liquid under mild heating).

In an embodiment, a gel can be formed by mixing PAA and PTMEG at a ratio, by weight, of about 1 to 3 (PAA to PTMEG). In another embodiment, PAA (e.g., PAA powder) can be added to PTMEG while continuously stirring a resulting mixture. The resulting mixture can be stirred by hand or with the aid of an electrical mixing device, such as, e.g., a motorized stirrer. In an embodiment, mixing can continue until the PAA has been fully mixed in the mixture and stirring becomes more difficult. This can occur due to an increase in viscosity of the mixture of PAA and PTMEG. In an embodiment, an increase in viscosity of the mixture accompanies a gelation process upon mixing PAA and a polyglycol, such as, e.g., PTMEG.

In an embodiment, a gel is formed by mixing PAA with a polyglycol and stirring the mixture for a time period between about 5 minutes and 40 minutes, or between about 10 minutes and 30 minutes, or between about 15 minutes and 20 minutes. In another embodiment, a gel is formed by mixing PAA with PTMEG (also "PTMG" herein) and stirring the mixture for a time period between about 5 minutes and 40 minutes, or between about 10 minutes and 30 minutes, or between about 15 minutes and 20 minutes.

A hydrogel can be formed by mixing a first polymeric material, second polymeric material and third material at a temperature between about 15° C. and 30° C. and heating the mixture up to a temperature between about 50° C. and 100° C., or between about 55° C. and 70° C., or between about 58° C. and 62° C. In some cases, a hydrogel is formed by mixing a first polymeric material, a second polymeric material and a third material at a temperature between about 15° C. and 30° C. and heating the mixture up to a temperature of about 55° C., or 55° C., or 57° C., or 58° C., or 59° C., or 60° C., or 61° C., or 62° C., or 63° C., or 64° C., or 65° C. The first polymeric material can include PAA, the second polymeric material can include PTMEG, and the third material can include acrylamide (AAm). In an embodiment, forming the mixture at a temperature between about 15° C. and 30° C. induces the formation of hydrogen bonds between the first polymeric material (e.g., PAA) and the second polymeric material (e.g., PTMEG).

In another embodiment, a hydrogel is formed by mixing a first polymeric material, second polymeric material and a material having a vinyl functionality at a temperature between about 15° C. and 30° C. and heating the mixture up to a temperature of about 55° C., or 55° C., or 57° C., or 58° C., or 59° C., or 60° C., or 61° C., or 62° C., or 63° C., or 64° C., or 65° C. The first polymeric material can include PAA, the second polymeric material can include PTMEG, and the monomer can include a material having acrylamide (AAm). In some examples, a material having a vinyl functionality (also referred to as "vinyl-containing material" herein) is acrylic acid, methylacrylic acid, vinyl alcohol, vinyl acetate, butyl acrylate, vinyl acrylate, vinylbenzoic acid, vinylbenzyl alcohol, vinylboronic acid dibutyl ester, vinylformamide, vinyl methacrylate, vinylpyridine, 1-vinyl-2-pyrrolidone, vinylsulfonic acid and vinyltrimethoxysilane. In some embodiments, a material having a vinyl functionality can be a vinyl-containing polymer (also referred to as "vinyl-containing material" herein). When a vinyl-containing monomer or polymer is an acid, a gel may comprise a salt derivative of the acid. For example, when the monomer is acrylic acid, a gel may comprise a sodium or potassium salt of acrylic acid, or a sodium or potassium salt of polyacrylic acid. In some embodiments, the vinyl-containing material is covalently bonded to polyacrylic acid.

In some embodiments, a hydrogel is formed by combining a first polymeric material and second polymeric material, wherein one or more of the first and second polymeric materials have one or more hydrophilic moieties (or subgroups). In an embodiment, the second polymeric material can include $-O-(CH_2)_n$ subunits, wherein 'n' is a number greater than or equal to 1, or 2, or 3, or 4, or 5, or 6, or 7, or 8, or 9, or 10, or 11, or 12, or 13, or 14, or 15, or 16, or 17, or 18, or 19, or 20. In another embodiment, the second polymeric material can include $-O-(CH_2CH_2)_m$ subunits, wherein 'm' is a number greater than or equal to 1, or 2, or 3, or 4, or 5, or 6, or 7, or 8, or 9, or 10, or 11, or 12, or 13, or 14, or 15, or 16, or 17, or 18, or 19, or 20 (see above). One or more of the first and second polymeric materials can be joined together through hydrogen bonding interactions, between the first and second polymeric materials, between the first polymeric material or second polymeric material, or both. In an embodiment, the first and third polymeric materials can be joined by hydrogen bonding interactions. In another embodiment, the first polymeric material can be hydrogen-bonded to another first polymeric material. In another embodiment, one or more of the first and second polymeric materials can be joined together through cross-linkages (or cross-linking interactions), such as ionic or covalent bonds. In an embodiment, the first polymeric material is PAA or a salt of derivative of PAA and the second polymeric material is a polyglycol (e.g., PTMEG or a salt or derivative of PTMEG). In another embodiment, the first polymeric material is PAA or a salt of derivative of PAA and the second polymeric material is PTMEG or a salt or derivative of PTMEG. In another embodiment, the first polymeric material is PAA or a salt or derivative of PAA, and the second polymeric material is PAM or a salt or derivative of PAM. In another embodiment, the first polymeric material is a polyglycol (e.g., PTMEG or a salt or derivative of PTMEG), and the second polymeric material is PAM or a salt or derivative of PAM. In another embodiment, the first polymeric material is PTMEG or a salt or derivative of PTMEG, and the second polymeric material is PAM or a salt or derivative of PAM.

In some examples, a hydrogel is formed by combining a first polymeric material, second polymeric material, and third polymeric material, wherein one or more of the first, second and third polymeric materials have one or more hydrophilic moieties (or subgroups). In an embodiment, the first polymeric material can include PAA. The second polymeric material can include $-O-(CH_2)_n$ subunits, wherein 'n' is a number greater than or equal to 1, or 2, or 3, or 4, or 5, or 6, or 7, or 8, or 9, or 10, or 11, or 12, or 13, or 14, or 15, or 16, or 17, or 18, or 19, or 20. In some cases, 'n' is a number greater than or equal to 3, or greater than or equal to 4, or greater than or equal to 5. The second polymeric material may include $-O-(CH_2CH_2)_m$ subunits, wherein 'm' is a number greater than or equal to 1, or 2, or 3, or 4, or 5, or 6, or 7, or 8, or 9, or 10, or 11, or 12, or 13, or 14, or 15, or 16, or 17, or 18, or 19, or 20 (see above). In some cases, 'm' is a number greater than or equal to 2, or greater than or equal to 3, or greater than or equal to 4. Two or more of the first, second and third polymeric materials can be joined together through hydrogen bonding interactions. In an example, the first and third polymeric materials can be joined by hydrogen bonding interactions. In another example, the first and second polymeric materials can be joined by hydrogen bonding interactions. In another example, the second and third polymeric materials can be joined by hydrogen bonding interactions. In another example, the first, second and third polymeric materials can be joined by hydrogen bonding interactions. In another example, the first, second or third polymeric material can be hydrogen-bonded to another first, second or third polymeric material, respectively. In another example, one or more of the first, second and third polymeric materials can be joined together through cross-linkages (or cross-linking interactions), such as ionic or covalent bonds. In an embodiment, the first polymeric material is PAA or a salt of derivative of PAA, the second polymeric material is a polyglycol (e.g., PTMEG or a salt or derivative of PTMEG), and the third polymeric material is PAM or a salt or derivative of PAM. In another embodiment, the first polymeric material is PAA or a salt of derivative of PAA, the second polymeric material is PTMEG or a salt or derivative of PTMEG, and the third polymeric material is PAM or a salt or derivative of PAM.

In some embodiments, a hydrogel is formed by combining PAA, PTMEG (or PEG) and PAM to form a mixture (or blend). In an embodiment, the mixture is heated during preparing the mixture, after forming the mixture, or both. In some cases, the mixture is not heated. In other cases, the mixture is prepared at a temperature between about 10° C. and 100° C., or between about 15° C. and 80° C., or 20° C. and 50° C.

In alternative embodiments, non-toxic and biodegradable hydrogels can be prepared by using acrylic acid plus environmentally-friendly polymers. Such non-toxic and biodegradable hydrogels can be friendly to the environment (also referred to as "environmentally-friendly hydrogels" herein), as they minimize, if not eliminate, the production of hazardous components, thereby minimizing, if not eliminating, the risk of hazardous components from entering (or leaching into) water supplies, for example.

In an embodiment, a hydrogel can be formed by combining gels as formed by methods described herein with an environmentally-friendly polymer, such as a polymer occurring in nature, including polymers that can be extracted from substances occurring naturally in nature. Natural polymers can include one or more of a cellulose (e.g., carboxymethyl cellulose), gelatin and clay. In another embodiment, a hydrogel can be formed by combining PAA, a polyglycol (e.g., PTMEG) and one or more natural polymers in place of an acrylamide-containing polymer (e.g., PAM). In another embodiment, a hydrogel can be formed by combining PAA, a polyglycol (e.g., PTMEG), an acrylamide-containing polymer (e.g., PAM), and one or more natural polymers, such as one or more of a cellulose or cellulose-containing material (e.g., carboxymethyl cellulose), clay and gelatin. In an embodiment, a natural polymer can include a cellulose or a derivative or a cellulose, such as carboxymethyl cellulose. In another embodiment, a natural polymer can include clay. In another embodiment, a natural polymer can include gelatin. In another embodiment, a natural polymer can include one or more of a cellulose, clay and gelatin. In some embodiments, a natural polymer can include any substance that does not decompose under ambient conditions or is configured to decompose into a substance that is not unfriendly to the environment, or not otherwise hazardous (e.g., not toxic to animals). In an embodiment, a hydrogel is formed by combining PAA, a polyglycol (e.g., PTMEG) and one or more environmentally-friendly polymers or subunits (including monomers) of the one or more environmentally-friendly polymers.

In an embodiment, a hydrogel can be formed by combining PAA, PTMEG and a cellulose, such as, e.g., carboxymethyl cellulose. In another embodiment, a hydrogel can be formed by combining PAA, PTMEG and gelatin. In another embodiment, a hydrogel can be formed by combining PAA, PTMEG and clay. In another embodiment, a hydrogel can be formed by combining PAA, PTMEG and one or more of a cellulose (e.g., carboxymethyl cellulose), gelatin and clay.

In some embodiments, a polyglycol is an environmentally friendly polyglycol, such as PTMEG. The environmentally friendly polyglycol can be combined with, for example, PAA to form an environmentally friendly hydrogel.

In some embodiments, a hydrogel is provided comprising PAA, a polyglycol, and polyvinyl alcohol (PVA). PVA can be used in place of an acrylamide-containing polymer (e.g., PAM). In an embodiment, a hydrogel is provided comprising PAA, a polyglycol (e.g., PTMEG), PVA, clay and a cellulose (e.g., carboxylmethyl cellulose). In such cases, PAA can be hydrogen-bonded to the polyglycol, as described above.

In some examples, a hydrogel can be formed by combining PAA, a polyglycol (e.g., PTMEG) and acrylamide monomers to form a mixture, and heating the mixture to form the hydrogel. In such a case, heating the mixture causes the acrylamide monomers to polymerize. In other examples, a hydrogel can be formed by combining PAA, a polyglycol (e.g., PTMEG) and an environmentally-friend polymer or polymer subunit (or monomer) to form a mixture, and heating the mixture. In some cases, heating the mixture polymerizes natural or environmentally-friendly polymer subunits (or monomers).

Gel and Hydrogel Properties

Gels and hydrogels formed according to methods described herein can have material properties, such as glass transition temperature, viscosity, hardness, conductivity, and tensile strength, suited to various uses and applications, such as agricultural applications or purposes.

In an embodiment, a gel or hydrogel having PAA and a polyglycol has a rubber-like texture (soft or tough rubber) at a temperature between about 10° C. and 40° C., or 15° C. and 30° C. In another embodiment, mixing PAA and PTMEG produces a gel or hydrogel having properties that can be different from the properties of the PAA and PTMEG components. In an example, with reference to FIG. 8, a gel formed from PAA and PTMEG shows a glass transition temperature, or melting point ($T_m$) of 74° C., which differs from the $T_m$ at 123° C. of PAA by itself or the $T_m$ of 13° C. of PTMEG by itself, as indicated by differential scanning calorimetry (DSC). In another embodiment, a gel formed from PAA and PTMEG does not exhibit a crystal structure; it can be amorphous.

In an embodiment, a gel or hydrogel formed of PAA and a polyglycol can have a compressive strength of at least about 100 $g/cm^2$, or at least about 500 $g/cm^2$, or at least about 1,000 $g/cm^2$, or at least about 2,000 $g/cm^2$, or at least about 3,000 $g/cm^2$, or at least about 4,000 $g/cm^2$, or at least about 5,000 $g/cm^2$, or at least about 6,000 $g/cm^2$, or at least about 7,000 $g/cm^2$, or at least about 8,000 $g/cm^2$, or at least about 9,000 $g/cm^2$, or at least about 10,000 $g/cm^2$, or at least about 15,000 $g/cm^2$, or at least about 20,000 $g/cm^2$, or at least about 40,000 $g/cm^2$, or at least about 100,000 $g/cm^2$, or at least about 200,000 $g/cm^2$. In another embodiment, a gel or hydrogel formed of PAA and PTMEG can have a compressive strength of at least about 100 $g/cm^2$, or at least about 500 $g/cm^2$, or at least about 1,000 $g/cm^2$, or at least about 2,000 $g/cm^2$, or at least about 3,000 $g/cm^2$, or at least about 4,000 $g/cm^2$, or at least about 5,000 $g/cm^2$, or at least about 6,000 $g/cm^2$, or at least about 7,000 $g/cm^2$, or at least about 8,000 g/cm², or at least about 9,000 g/cm², or at least about 10,000 g/cm². In another embodiment, a gel or hydrogel formed of PAA and a polyglycol can have a compressive strength of at least about 1,000 g/cm², or 2,000 g/cm², or 3,000 g/cm², or 4,000 g/cm² or 5,000 g/cm², or 6,000 g/cm², or 7,000 g/cm², or 8,000 g/cm² without failure. Compressive strength can be assessed based on stress-strain measurements. In another embodiment, a gel or hydrogel formed of PAA and a polyglycol can have a compressive strength between about 100 g/cm² and 9,000 g/cm². In another embodiment, a gel or hydrogel formed of PAA and PTMEG can have a compressive strength between about 100 g/cm² and 9,000 g/cm².

In an embodiment, a gel or hydrogel formed of PAA and a polyglycol can have a tensile strength of at least about 100 g/cm², or at least about 500 g/cm², or at least about 1,000 g/cm², or at least about 2,000 g/cm², or at least about 3,000 g/cm², or at least about 4,000 g/cm², or at least about 5,000 g/cm², or at least about 6,000 g/cm², or at least about 7,000 g/cm², or at least about 8,000 g/cm², or at least about 9,000 g/cm², or at least about 10,000 g/cm², or at least about 15,000 g/cm², or at least about 20,000 g/cm², or at least about 40,000 g/cm², or at least about 100,000 g/cm², or at least about 200,000 g/cm². In another embodiment, a gel or hydrogel formed of PAA and PTMEG can have a tensile strength of at least about 100 g/cm², or at least about 500 g/cm², or at least about 1,000 g/cm², or at least about 2,000 g/cm², or at least about 3,000 g/cm², or at least about 4,000 g/cm², or at least about 5,000 g/cm², or at least about 6,000 g/cm², or at least about 7,000 g/cm², or at least about 8,000 g/cm², or at least about 9,000 g/cm², or at least about 10,000 g/cm². In another embodiment, a gel or hydrogel formed of PAA and a polyglycol can have a tensile strength of at least about 1,000 g/cm², or 2,000 g/cm², or 3,000 g/cm², or 4,000 g/cm², or 5,000 g/cm², or 6,000 g/cm², or 7,000 g/cm², or 8,000 g/cm² without failure. Tensile strength can be assessed based on stress-strain measurements. In another embodiment, a gel or hydrogel formed of PAA and a polyglycol can have a tensile strength between about 100 g/cm² and 9,000 g/cm². In another embodiment, a gel or hydrogel formed of PAA and PTMEG can have a tensile strength between about 100 g/cm² and 9,000 g/cm².

Over sufficiently long periods of time, a strengthening of the polymeric gel can be detected. This aging process can lead to stress-strain curves in compression that parallel the original stress-strain curve, but displaced slightly higher (and growing higher with time).

A gel or hydrogel having PAA and a polyglycol can comprise hydrogen bonds between the PAA and polyglycol. In some cases, a gel having PAA and a polyglycol comprises covalent bonds between the PAA and polyglycol. In other cases, a gel or hydrogel having PAA and a polyglycol comprises ionic bonds between the PAA and polyglycol. A gel or hydrogel having PAA and a polyglycol can comprise one or more of hydrogen, covalent and ionic bonds between the PAA and polyglycol.

In an embodiment, a gel or hydrogel having PAA and PTMEG comprises hydrogen bonds between the PAA and PTMEG. In some cases, a gel or hydrogel having PAA and PTMEG comprises covalent bonds between the PAA and PTMEG. In other cases, a gel or hydrogel having PAA and PTMEG comprises ionic bonds between the PAA and PTMEG. A gel or hydrogel having PAA and PTMEG may comprise one or more of hydrogen, covalent and ionic bonds between the PAA and PTMEG.

In an embodiment, a gel or hydrogel comprising PAA and a polyglycol includes a three-dimensional network of hydrogen bonds between the PAA and polyglycol. In another embodiment, a gel or hydrogel comprising PAA and PTMEG includes a three-dimensional network of hydrogen bonds between the PAA and PTMEG.

Figure 2:
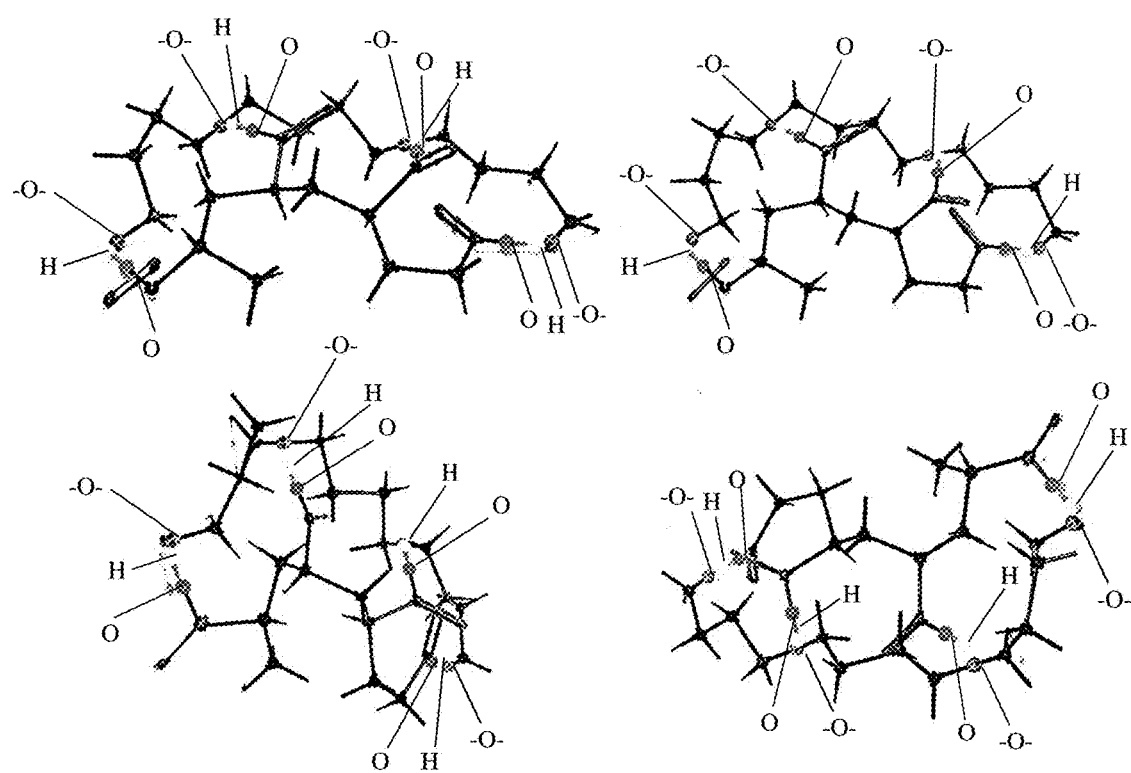
FIG. 2 illustrates hydrogen bonding between monomeric subunits of a gel, in accordance with an embodiment of the invention. Hydroxyl oxygen (O), hydrogen (H) and polymeric chain oxygen (—O—) have been indicated.

With reference to FIG. 2, a model illustrating a gel having hydrogen bonds between PAA and PTMEG is shown, in accordance with an embodiment of the invention. Oxygen and hydrogen atoms have been indicated in the figure. Carbon atoms are located at the intersections of unparallel lines (bonds).

In an embodiment, a gel is provided for use with hydrogels. A hydrogel may have a water absorbency (or water retention capacity) of at least about 10%, or 20%, or 30%, or 40%, or 50%, or 60%, or 70%, or 80%, or 90%, or 100%, or 150%, or 200%, or 250%, or 300%, or 350%, or 400%, or 450%, or 500%, or 550%, or 600%, or 650%, or 700%, or 750%, or 800%, or 850%, or 900%, or 950%, or 1000%, or more the weight of the hydrogel. In some cases, a hydrogel comprising PAA and PTMEG is provided having a water absorbency (or water retention capacity) of at least about 10%, or 20%, or 30%, or 40%, or 50%, or 60%, or 70%, or 80%, or 90%, or 100%, or 150%, or 200%, or 250%, or 300%, or 350%, or 400%, or 450%, or 500%, or 550%, or 600%, or 650%, or 700%, or 750%, or 800%, or 850%, or 900%, or 950%, or 1000%, or more the weight of the hydrogel. In another embodiment, a hydrogel comprising PAA, PTMEG and polyacrylamide ("PAM") is provided having a water absorbency (or water retention capacity) of at least about 10%, or 20%, or 30%, or 40%, or 50%, or 60%, or 70%, or 80%, or 90%, or 100%, or 150%, or 200%, or 250%, or 300%, or 350%, or 400%, or 450%, or 500%, or 550%, or 600%, or 650%, or 700%, or 750%, or 800%, or 850%, or 900%, or 950%, or 1000%, or more the weight of the hydrogel.

In an embodiment, a hydrogel is provided having a water absorbency (or water retention capacity) of up to about 10%, or 20%, or 30%, or 40%, or 50%, or 60%, or 70%, or 80%, or 90%, or 100%, or 150%, or 200%, or 250%, or 300%, or 350%, or 400%, or 450%, or 500%, or 550%, or 600%, or 650%, or 700%, or 750%, or 800%, or 850%, or 900%, or 950%, or 1000%, or more the weight of the hydrogel. In another embodiment, a hydrogel comprising PAA and PTMEG is provided having a water absorbency (or water retention capacity) of up to about 10%, or 20%, or 30%, or 40%, or 50%, or 60%, or 70%, or 80%, or 90%, or 100%, or 150%, or 200%, or 250%, or 300%, or 350%, or 400%, or 450%, or 500%, or 550%, or 600%, or 650%, or 700%, or 750%, or 800%, or 850%, or 900%, or 950%, or 1000%, or more the weight of the hydrogel. In another embodiment, a hydrogel comprising PAA, PTMEG and polyacrylamide ("PAM") is provided having a water absorbency (or water retention capacity) of up to about 10%, or 20%, or 30%, or 40%, or 50%, or 60%, or 70%, or 80%, or 90%, or 100%, or 150%, or 200%, or 250%, or 300%, or 350%, or 400%, or 450%, or 500%, or 550%, or 600%, or 650%, or 700%, or 750%, or 800%, or 850%, or 900%, or 950%, or 1000%, or more the weight of the hydrogel.

In an example, a gel is provided for use with hydrogels. In an embodiment, a hydrogel is provided having a water absorbency (or water retention capacity) up to about 10 times, or 20 times, or 30 times, or 40 times, or 50 times, or 60 times, or 70 times, or 80 times, or 90 times, or 100 times, or 200 times, or 300 times, or 400 times, or 500 times, or 600 times, or 700 times, or 800 times, or 900 times, or 1000 times, or 2000 times, or 3000 times, or 4000 times, or 5000 times, or 6000 times, or 7000 times, or 8000 times, or 9000 times, or 10,000 times, or 20,000 times, or 40,000 times, or 80,000 times, or 100,000 times, or more the weight of the hydrogel. In another embodiment, a hydrogel comprising PAA and PTMEG is provided having a water absorbency (or water retention capacity) up to about 10 times, or 20 times, or 30 times, or 40 times, or 50 times, or 60 times, or 70 times, or 80 times, or 90 times, or 100 times, or 200 times, or 300 times, or 400 times, or 500 times, or 600 times, or 700 times, or 800 times, or 900 times, or 1000 times, or 2000 times, or 3000 times, or 4000 times, or 5000 times, or 6000 times, or 7000 times, or 8000 times, or 9000 times, or 10,000 times, or 20,000 times, or 40,000 times, or 80,000 times, or 100,000 times, or more the weight of the hydrogel. In another embodiment, a hydrogel comprising PAA, PTMEG and polyacrylamide ("PAM") is provided having a water absorbency (or water retention capacity) up to about 10 times, or 20 times, or 30 times, or 40 times, or 50 times, or 60 times, or 70 times, or 80 times, or 90 times, or 100 times, or 200 times, or 300 times, or 400 times, or 500 times, or 600 times, or 700 times, or 800 times, or 900 times, or 1000 times, or 2000 times, or 3000 times, or 4000 times, or 5000 times, or 6000 times, or 7000 times, or 8000 times, or 9000 times, or 10,000 times, or 20,000 times, or 40,000 times, or 80,000 times, or 100,000 times, or more the weight of the hydrogel.

In an example, a gel is provided for use with hydrogels. A hydrogel is provided such that the hydrogel remains substantially unchanged after at least 1, or 2, or 3, or 4, or 5, or 6, or 7, or 8, or 9, or 10, or 11, or 12, or 13, or 14, or 15, or 16, or 17, or 18, or 19, or 20, or 21, or 22, or 23, or 24, or 25, or 26, or 27, or 28, or 29, or 30, or 31, or 32, or 33, or 34, or 35, or 36, or 37, or 38, or 39, or 40, or 41, or 42, or 43, or 44, or 45, or 46, or 47, or 48, or 49, or 50, or 70, or 80, or 90, or 100, or more hydration-dehydration cycles (See, for example, Example 21).

In an example, a gel is provided for use with hydrogels. In an embodiment, a hydrogel is provided having a water absorbency (or water retention capacity) of at least about 10 times, or 20 times, or 30 times, or 40 times, or 50 times, or 60 times, or 70 times, or 80 times, or 90 times, or 100 times, or 200 times, or 300 times, or 400 times, or 500 times, or 600 times, or 700 times, or 800 times, or 900 times, or 1000 times, or 2000 times, or 3000 times, or 4000 times, or 5000 times, or 6000 times, or 7000 times, or 8000 times, or 9000 times, or 10,000 times, or 20,000 times, or 40,000 times, or 80,000 times, or 100,000 times, or more the weight of the hydrogel. In another embodiment, a hydrogel comprising PAA and PTMEG is provided having a water absorbency (or water retention capacity) of at least about 10 times, or 20 times, or 30 times, or 40 times, or 50 times, or 60 times, or 70 times, or 80 times, or 90 times, or 100 times, or 200 times, or 300 times, or 400 times, or 500 times, or 600 times, or 700 times, or 800 times, or 900 times, or 1000 times, or 2000 times, or 3000 times, or 4000 times, or 5000 times, or 6000 times, or 7000 times, or 8000 times, or 9000 times, or 10,000 times, or 20,000 times, or 40,000 times, or 80,000 times, or 100,000 times, or more the weight of the hydrogel. In another embodiment, a hydrogel comprising PAA, PTMEG and polyacrylamide ("PAM") is provided having a water absorbency (or water retention capacity) of at least about 10 times, or 20 times, or 30 times, or 40 times, or 50 times, or 60 times, or 70 times, or 80 times, or 90 times, or 100 times, or 200 times, or 300 times, or 400 times, or 500 times, or 600 times, or 700 times, or 800 times, or 900 times, or 1000 times, or 2000 times, or 3000 times, or 4000 times, or 5000 times, or 6000 times, or 7000 times, or 8000 times, or 9000 times, or 10,000 times, or 20,000 times, or 40,000 times, or 80,000 times, or 100,000 times, or more the weight of the hydrogel.

Gels and hydrogels provided herein can have various shapes, such as a shape with a spherical, triangular, square, rectangular, pentagonal, hexagonal, or octagonal cross section. In some cases, gels and hydrogels can be shaped using molds (or templates) with the desired shape. Hydrogels can have sizes (e.g., diameters) of at least about 100 nanometers (nm), or 500 nm, or 1 micrometer (µm), or 100 µm, or 500 µm, or 1 mm, or 10 mm, or 50 mm, or 1 cm, or 50 cm, or 1 m, or 5 m, or 10 m, or 100 m, or more.

Gel and Hydrogel Applications

Gels and hydrogels provided herein can have various uses. In an embodiment, a gel or hydrogel formed according to the methods described herein can be used as an implant for facial reconstruction. The gel or hydrogel may be formed into a plate for this application.

In some cases, a gel or hydrogel formed according to the methods described herein may be used as an artificial skin. The gel or hydrogel may be formed into thin sheets for this application. This can be advantageous in treating wounds, for example.

In some cases, a gel or hydrogel formed according to the methods described herein may be used for cell culture matrix. The gel or hydrogel may be filled with nutrients to promote cell growth.

In some cases, a gel or hydrogel formed according to the methods described herein can be used as a support of drug delivery. The gel or hydrogel may be filled with a drug solution and slowly release the drug solution over time.

In some cases, a gel or hydrogel formed according to the methods described herein can be used as a compatibilizer to blend with polyethylene or polystyrene, to form a composite having tensile and impact strength that his higher than tensile and impact strength of the polyethylene or the polystyrene by itself, respectively.

In some cases, a gel or hydrogel formed according to the methods described herein can be used as artificial soil. The artificial soil can be formed by combining gel or hydrogel and a nutrient, such as a fertilizer. The artificial soil can further comprise a seed that yields a plant grown in the artificial soil. In some situations the seed can be circumscribed by a hydrogel.

In some cases, a gel formed according to the methods described herein can be used to form, or serve as a component of, a hydrogel, a gel for storing or retaining a gas, or a gel for storing or retaining a fluid, such as, e.g., water and oil. In some cases, a hydrogel can be used to clean up an oil spill.

In an embodiment, gels provided herein can be configured for use as hydrogels to store and retain water. In another embodiment, gels provided herein can be configured to store, retain, or absorb a gas (e.g., NOx, SOx, $NH_3$). In another embodiment, gels provided herein can be configured to store, retain, or absorb a viscous fluid, such as, e.g., an oil. In another embodiment, gels provided herein can be configured to store, retain, or absorb a fluid, such as, e.g., a solvent.

Figure 3:
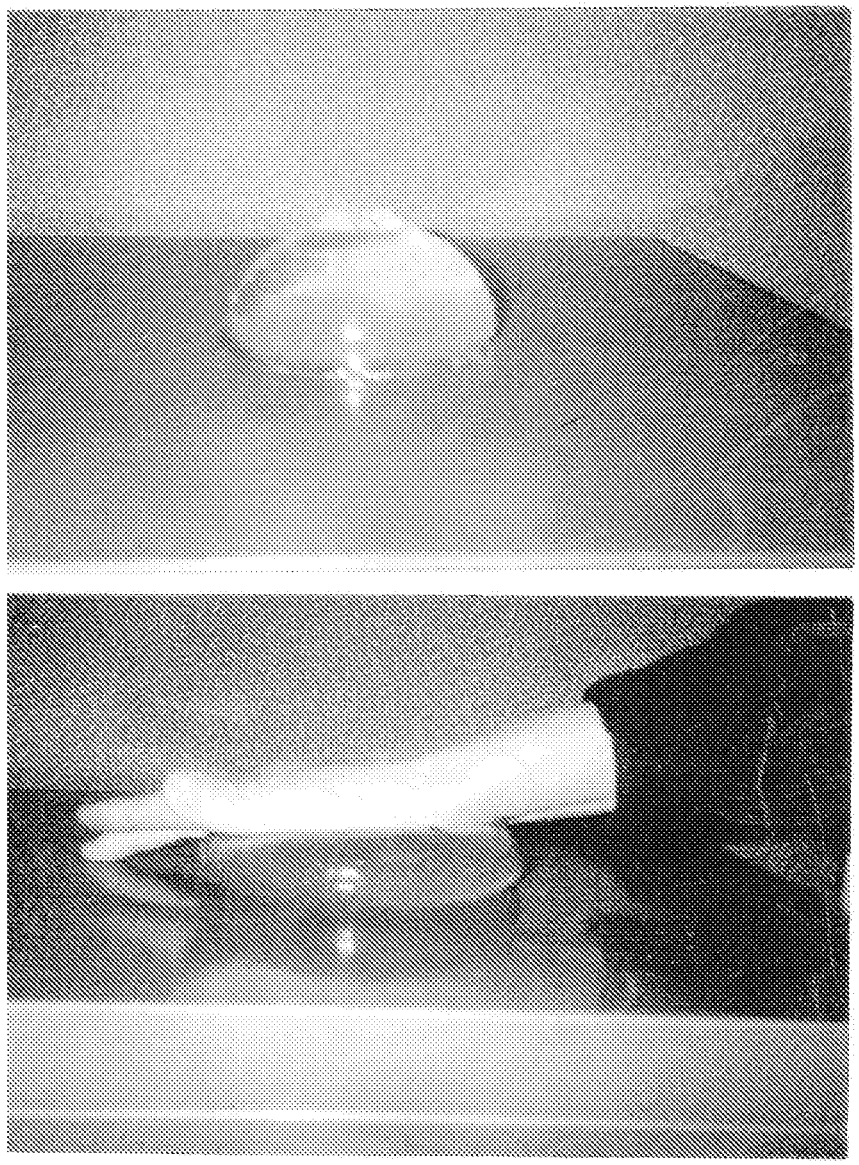
FIG. 3 illustrates a gel formed by the method of Example 1.

With reference to FIG. 3, a gel formed from PAA and PTMEG is illustrated, in accordance with an embodiment of the invention. The gel can have strength, as described above. The gel can have fluid properties that permit the gel to be used various applications. For example, the gel of FIG. 3 can be used in hydrogels, medical devices (e.g., implants), and mechanical devices. As another example, the gel can be used as an electrically or thermally insulating barrier between two or more objects.

In some cases, the gel can be configured for use with a hydrogel. In another embodiment, the gel can be configured for use with medical devices. In another embodiment, the gel can be configured for use with fertilizers or pesticides.

Polymeric materials, gels, and hydrogels, including components of the gels and hydrogels, and methods provided herein can be modified or combined with other polymeric materials, gels, hydrogels and methods, including methods of use and methods for manufacture, such as, for example, Hennink et al., Advanced Drug Delivery Review, 54 (2002) 13-36; Hoffman et al., Advanced Drug Delivery Reviews 43 (2002) 3-12; U.S. Pat. No. 3,137,592 to Protzman et al., U.S. Pat. No. 3,332,897 to Kumar, U.S. Pat. No. 3,496,254 to Wichterle, U.S. Pat. No. 3,981,100 to Weaver et al., U.S. Pat. No. 4,134,871 to Otani et al., U.S. Pat. No. 4,552,940 to Van Eanam, U.S. Pat. No. 4,783,510 to Saotome, U.S. Pat. No. 5,039,459 to Kindt-Larsen et al., U.S. Pat. No. 5,079,354 to Gross et al., U.S. Pat. No. 5,385,983 to Graham, U.S. Pat. No. 5,523,372 to Fisk, U.S. Pat. No. 5,883,211 to Sassi, U.S. Pat. No. 6,271,278 to Park, U.S. Pat. No. 6,286,254 to Obonai et al., U.S. Pat. No. 6,339,039 Porath et al., U.S. Pat. No. 6,602,952 to Bentley et al., U.S. Pat. No. 6,120,803 to Wong et al., U.S. Pat. No. 6,615,539 to Obonai et al., U.S. Pat. No. 6,822,135 to Soerens et al., U.S. Pat. No. 7,459,501 to Doane et al., and U.S. Pat. No. 7,591,974 to Savich et al.; and PCT/US00/40163 to Bentley et al., which are entirely incorporated herein by reference.

For example, methods and compositions described herein can be used with or modified to work in conjunction with contact lenses, such as those described by U.S. Pat. No. 3,496,254. As another embodiment, ethylene glycol and polyethylene glycol can be used as starting materials to form gels. As another example, ethylene glycol monomethyacrylate with the corresponding dimethyacrylate can be used with gels of embodiments to form various materials, such as contact lenses. As another example, polymers of polyethylene glycol cross linked to chitosan can be used with gels and hydrogels provided herein. As another example, polymers of acrylamide and polyethylene glycol can be used with gels and hydrogels provided herein. As another example, gels of embodiments of the invention can be used with polyacrylamide backbones with hydrogen bonding to form thermo reversible hydrogels for electrophoresis. As another example, hydrophilic monomers, such as hydroxyalkyl methacrylate and dihydric alcohol (e.g., 1,4-butanediol), can be used with gels of embodiments of the invention for various uses, such as contact lenses. As another example, PAA can be combined with polyethylene glycol ("PEG") in water at various degrees of neutralization, molecular weights, and concentrations to form various materials. The proportion of PAA and PEG can be adjusted to form a gel having desirable material properties, such as viscosity, strength and conductivity. In addition, the proportion of PAA and PEG can be selected so as to minimize, if not eliminate, forming byproducts upon generating gels.

Soils and Seeds

In some embodiments, a plot of soil is provided comprising soil and a hydrogel in the soil. A hydrogel provided can have a composition as described herein. In an example, a hydrogel comprises a first polymeric material having a polyacrylic acid and a second polymeric material having a polyglycol. In some embodiments, the polyglycol is an environmentally friendly polyglycol. In some cases, the polyglycol is PTMEG.

In some embodiments, the first polymeric material is substantially a homopolymer. In some embodiments, the second polymeric material is substantially a homopolymer. The first polymeric material can be hydrogen bonded to the second polymeric material.

In some embodiments, a seed configured to grow in an arid environment is provided. The seed is provided in a system comprising a seed container having a gel or hydrogel described herein. The seed is disposed in the seed container. For example, the seed container can be formed of a first polymeric material and a second polymeric material, the first polymeric material having polyacrylic acid and the second polymeric material having a polyglycol. In some situations, the polyglycol is an environmentally friendly polyglycol. In some cases, the environmentally friendly polyglycol is PTMEG. In some embodiments, the first polymeric material and the second polymeric material are hydrogen bonded to one another. In some cases, the first polymeric material is substantially a homopolymer and/or the second polymeric material is substantially a homopolymer. In some cases, the first polymeric material and the second polymeric material are further combined with a vinyl-containing material.

In some embodiments, a seed in a hydrogel-containing seed container yields a plant comprising a leaf of higher mass than a seed lacking said seed container. In some examples, a seed in a hydrogel-containing seed container yields a plant comprising a root of higher mass than a seed lacking said seed container. In other examples, a method for growing a plant, comprising providing a seed in a hydrogel-containing seed container and a plot of soil, is provided. In some embodiments, a seed grown in a hydrogel-containing seed container yields a plant with a root whose mass is at least about twice, or about three times, or about five times, or about six times, or about eight times, or about ten times or more the mass of a root yielded by a seed not grown in a hydrogel-containing seed container. In some cases, a seed grown in a hydrogel-containing seed container yields a plant with a leaf whose mass is at least about twice, or about three times, or about five times, or about six times, or about eight times, or about ten times, or more the mass of a leaf yielded by a seed not grown in a hydrogel-containing seed container.

A hydrogel can be placed in a plot of soil. The plot can have various shapes and sizes, e.g., circular, a triangular, square or rectangular plots. The plot can have a size of at least 0.1 $ft^2$, or 1 $ft^2$, or 2 $ft^2$, or 3 $ft^2$, or 4 $ft^2$, or 5 $ft^2$, or 25 $ft^2$, or 50 $ft^2$, or 100 $ft^2$, or 5000 $ft^2$, or 1,000 $ft^2$, or 10,000 $ft^2$, or more.

Example 1

A gel is formed by mixing 11.5 g of PAA ($M_w$ of about 400,000 g/mol) and 37.0 g of PTMEG ($M_w$ of about 650 g/mol) and stirring the solids together, without solvent, at room temperature for about 24 hours. PAA and PTMEG were obtained from Aldrich Chemical Co. Fourier Transfer Infrared (also "FTIR" and "IR" herein) spectra of the gel are indicative of the presence of hydrogen bonding in the gel. In addition, the IR spectra show change with time due to the aging properties of the gel. The gel is resistive to attack (i.e., corrosion, decomposition) by organic solvents (e.g., acetone), strong bases (e.g., NaOH) and strong acids (e.g., $H_2SO_4$); the gel retains its properties (e.g., viscosity, strength) when exposed to organic solvents, strong bases and strong acids (both separate trials in acid and base and trials of gels exposed to acids and bases in succession).

Figure 4:
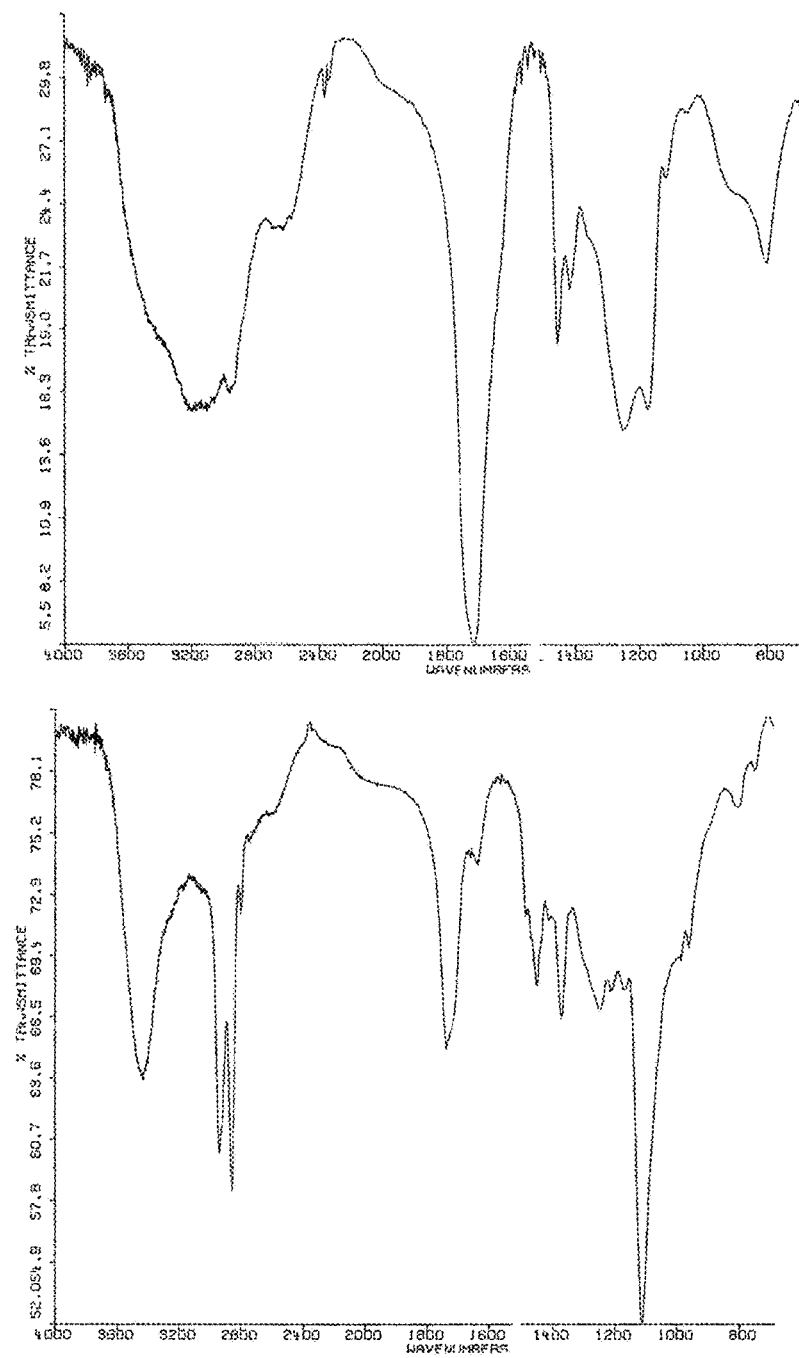
FIG. 4 shows Fourier Transform Infrared (FTIR) spectrographs for a polyacrylic acid sample (top) and a PAA-PTMEG three-dimensional polymeric gel (bottom)
Figure 5:
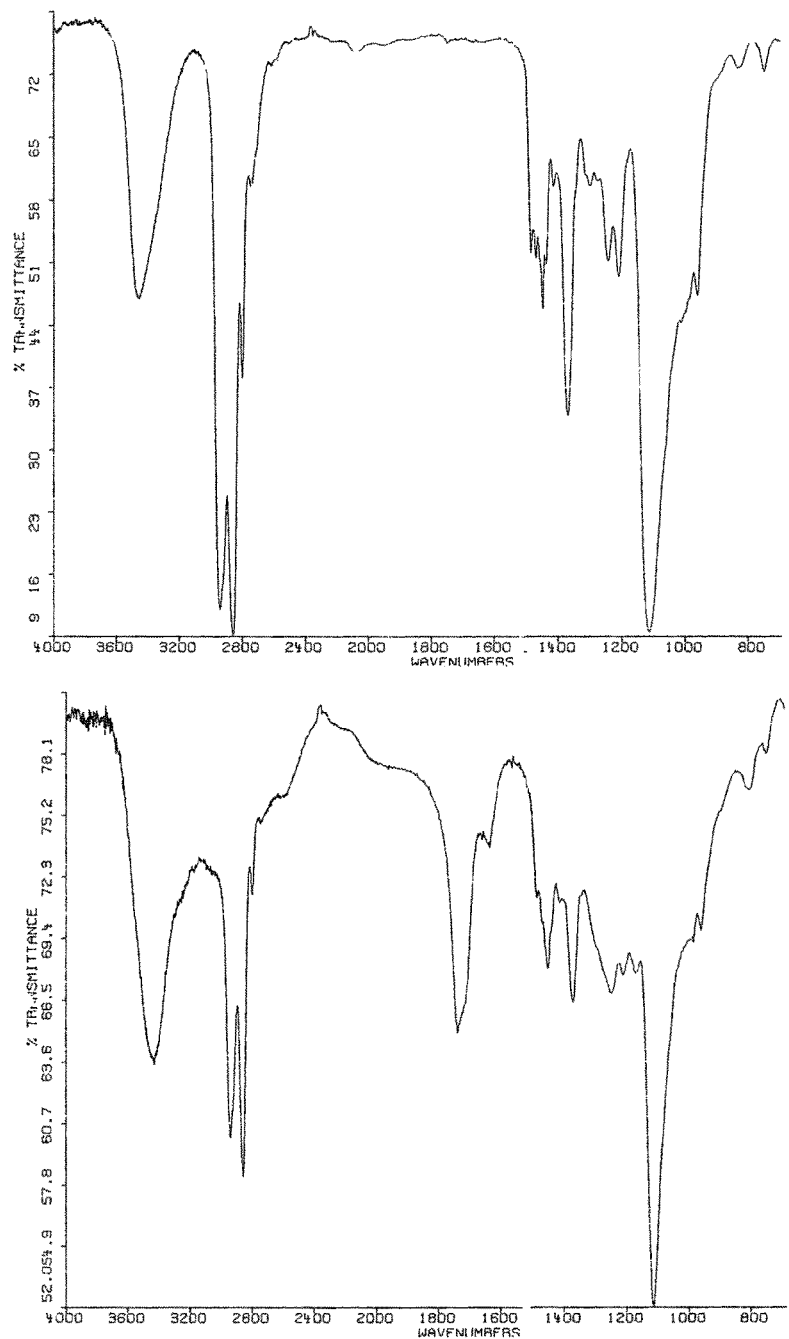
FIG. 5 shows FTIR spectrographs for PTMEG sample (top) and a PAA-PTMEG three-dimensional polymeric gel (bottom)
Figure 8:
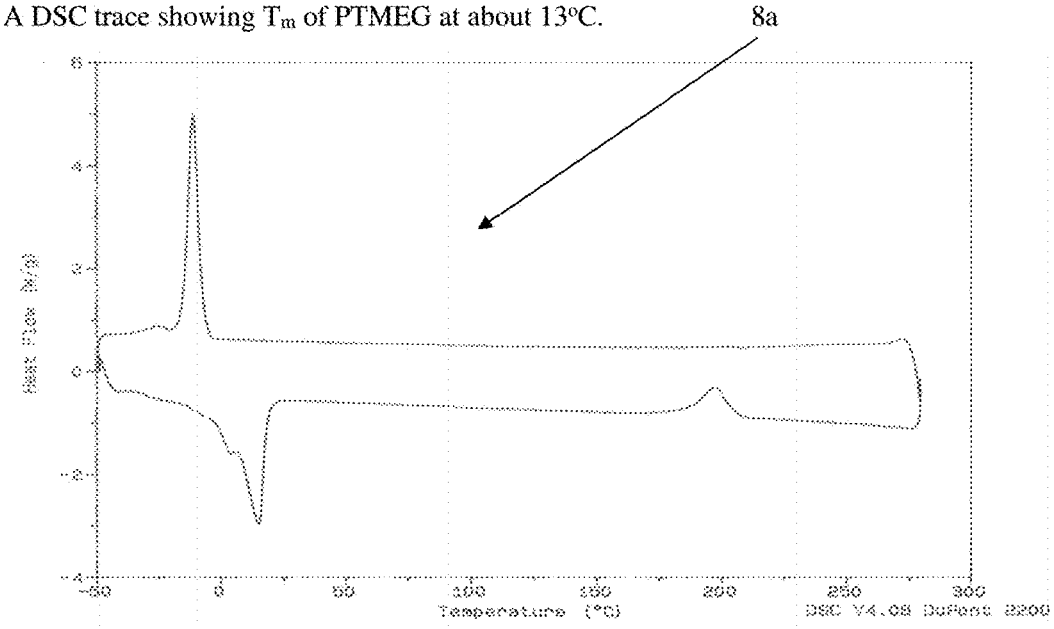
FIG. 8 shows a differential scanning calorimetry (DSC) trace of PTMEG (8a) and a PAA-PTMEG three-dimensional polymeric gel (8b)
Figure 8:
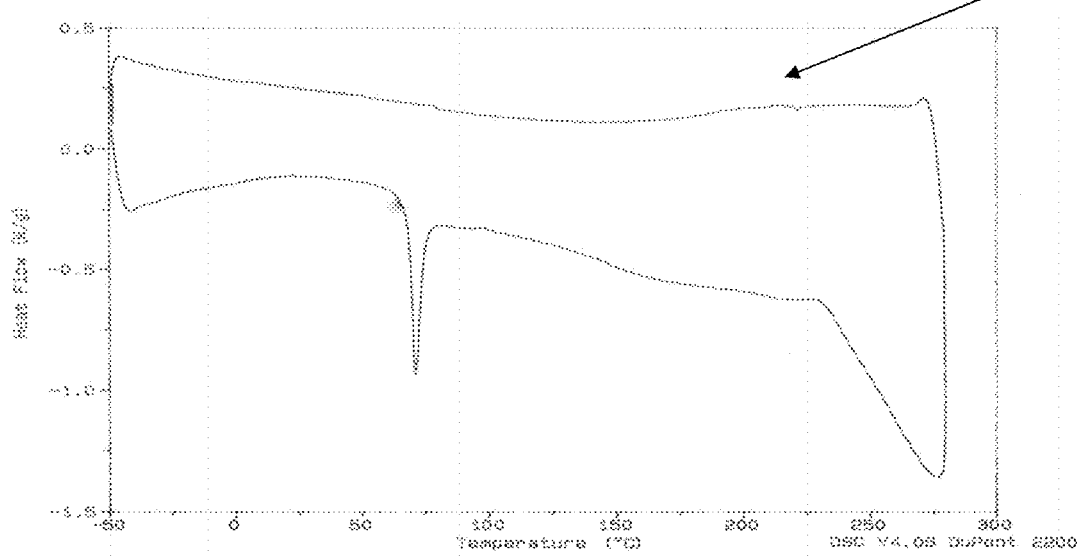

FIG. 4 shows Fourier Transform Infrared (FTIR) spectrographs of polyacrylic acid (PAA, top) and the gel (bottom) formed from PAA and PTMEG. FIG. 5 shows FTIR spectrographs for PTMEG sample (top) and the gel formed from PAA and PTMEG (bottom). The IR features for the three-dimensional polymeric gel are indicative of hydrogen bonding between PAA and PTMEG. The OH feature in the FTIR spectrographs is weakened upon formation of the gel, indicative of hydrogen bonding interactions. FIG. 8 shows a differential scanning calorimetry (DSC) trace of PTMEG (FIG. 8*a*) and a PAA-PTMEG three-dimensional polymeric gel (FIG. 8*b*).

Example 2

15.0 g of PAA powder ($M_w$ of about 400,000 g/mol) is mixed with 15.0 g of PTMEG ($M_w$ of about 650 g/mol) at a temperature of about 25° C. PAA and PTMEG are obtained from Aldrich Chemical Co. The mixing is continually processed until a uniform rubber-like and near transparent solid is formed. The shape of this gel material can selected by using molds or templates with shapes as desired (see FIG. 1).

Example 3

A hydrophilic hydrogel is produced by combining PAA and PTMEG polymers under normal hydrophilic monomer polymerization conditions (i.e., with the aid of a catalyst and a cross linker, and heating).

A hydrogel is prepared by the methods described herein. 11.2 g of poly(acrylic acid) ($M_w$ of about 400,000 g/mol), 50 g of PTMEG and 200 g of potato starch are dispersed into 2000 ml of water. Under stirring, 167 g of acrylic acid, 100 g of acrylamide, 3 g of N,N'-methylene bis(acrylamide) with 6 g of potassium persulfate are added into the above solution. The stirring is continued for about 20 minutes and 1 ml of tetramethylethylenediamine is added. Then the reactor is heated to 60° C. until a hydrogel is formed. The hydrogel formed is washed by water and cut into 1-1.5 $cm^3$ portions. The water absorbency of dried hydrogel is about 400 g of $H_2O$/g hydrogel.

Figure 6:
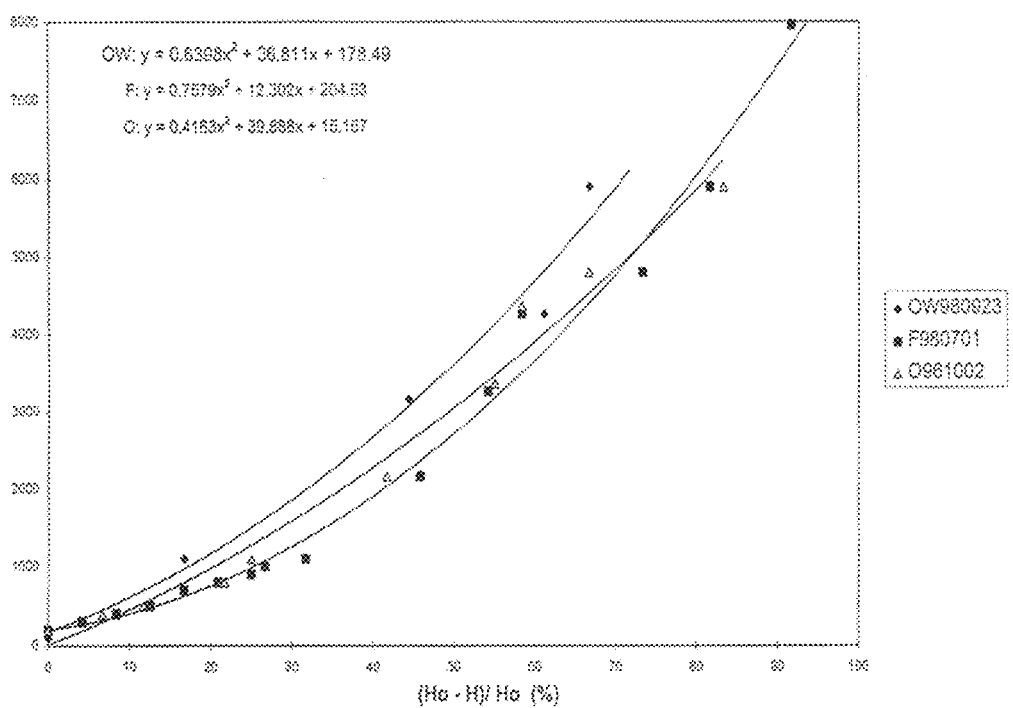
FIG. 6 shows compressive testing of a hydrogel.
Figure 7:
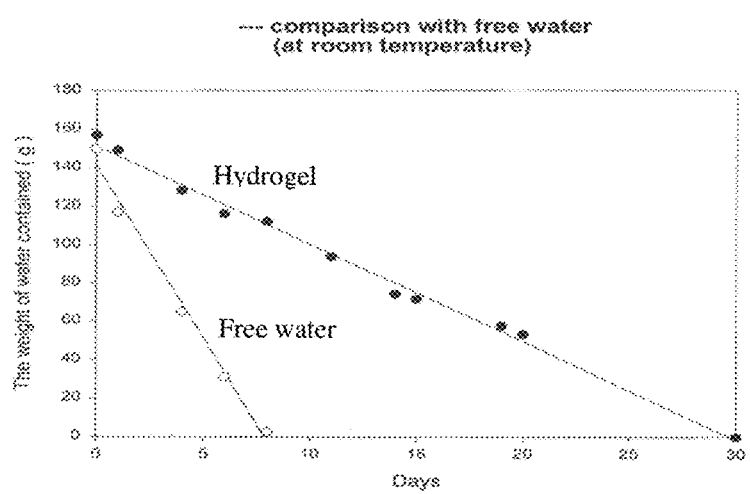
FIG. 7 shows the evaporation rate of water contained in a hydrogel.

FIG. 6 shows compressive testing of hydrogel, where the unit on the y-axis (measuring strength) is in grams (g). FIG. 7 shows the evaporation rate of water contained in the hydrogel as compared to the evaporation rate of free-standing (or "free") water at room temperature. Water in the hydrogel has a lower evaporation rate than free water. This is indicative of the water retention capability of the hydrogel.

Example 4

5 g of poly(acrylic acid) ($M_w$ of about 400,000 g/mol), 22.3 g of PTMEG and 200 g of potato starch are dispersed into 2000 ml of water. Under stirring, 200 g of acrylic acid, 80 g of acrylamide, 1 g of N,N'-methylene bis(acrylamide) with 6 g of potassium persulfate are added into the above solution. The stirring is continued for about 20 minutes and 1 ml of tetramethylethylenediamine is added. Then the reactor is heated to 60° C. until the gel is formed. The gel formed is washed by water and cut into 1-1.5 $cm^3$ species. The water absorbency of dried gel is about 400 g of $H_2O$/g of hydrogel.

Example 5

Hydrogels are formed by combining PAA, PTMEG, Acrylamide (AAm) and a cross-linker in water. A cross linker can be di(ethyleneglycol)divinyl ether, di(ethylglycol) diacrylate and N,N'-methylene bis(acrylamide). The hydrogels are prepared with the aid of the following: NaOH (aq) (7.380 g of NaOH dissolved into 200 ml of water) and, acrylamide (AAm), and a cross-linker. Polymerization is processed at 60° C. for 3-4 hours. The strengths of the hydrogels are assessed, as shown in the following table:

| Lot | PAA (g) | PTMEG (g) | NaOH | Water (for further NaOH dilution) | AAm (g) | Crosslinker (mol %) | Water (for reaction mixture) | Strength Test (g/cm²) |
|---|---|---|---|---|---|---|---|---|
| 0207A | 1.15 | 1.15 | 10 ml (~0.5 mol of PAA) | 90 ml | 6.0 | 3% 0.18 g | 100 ml | 941 g/cm² |
| 0220 | 1.15 | 1.15 | 10 ml (~0.5 mol of PAA) | 70 ml | 6.0 | 3% 0.18 g | 70 ml | 920 g/cm² |
| 0222 | 1.15 | 1.15 | 10 ml (~0.5 mol of PAA) | 50 ml | 6.0 | 3% 0.18 g | 40 ml | 910 g/cm² |
| 0314A | 0.25 | 0.25 | 2 ml (~0.5 mol of PAA) | 58 ml | 6.0 | 3% 0.18 g | 40 ml | 2460 g/cm² |
| 0314B | 0.25 | 0.25 | 2 ml (~0.5 mol of PAA) | 28 ml | 6.0 | 3% 0.18 g | 20 ml | 1600 g/cm² |

Example 6

Hydrogels are formed by combining PAA, PTMEG (or PEG), Acrylamide (AAm) and a cross-linker in water. The strengths of the hydrogels are assessed. The following table shows the strengths of hydrogels formed using either PTMEG or PEG:

| Lot | PAA (g) | PTMEG (g) | NaOH | Water (for further NaOH dilution) | AAm (g) | Crosslinker (mol %) | Water (for reaction mixture) | Strength Test (g/cm²) |
|---|---|---|---|---|---|---|---|---|
| 0207A | 1.15 | 1.15 | 10 ml (~0.5 mol of PAA) | 90 ml | 6.0 | 3% 0.18 g | 100 ml | 941 g/cm² |
| 0207B | 1.15 | PEG 0.7 g (1:1) | 10 ml (~0.5 mol of PAA) | 90 ml | 6.0 | 3% 0.18 g | 100 ml | 910 g/cm² |
| 0207C | 1.15 | — | 10 ml (~0.5 mol of PAA) | 90 ml | 6.0 | 3% 0.18 g | 100 ml | 700 g/cm² |

Example 7

Hydrogels are formed by combining PAA, PTMEG, Acrylamide and a cross-linker in water. The strengths of the hydrogels versus the amount of PAA used to form the hydrogel are assessed. The following table shows the strengths of hydrogels as a function of the amount of PAA used to form the hydrogels:

| Lot | PAA (g) | PTMEG (g) | NaOH | Water (for further NaOH dilution) | AAm (g) | Crosslinker (mol %) | Water (for reaction mixture) | Strength Test (g/cm²) |
|---|---|---|---|---|---|---|---|---|
| 0207A | 1.15 | 1.15 | 10 ml (~0.5 mol of PAA) | 90 ml | 6.0 | 3% 0.18 g | 100 ml | 941 g/cm² |
| 0302B | 0.5 | 0.5 | 3.8 ml (~0.5 mol of PAA) | 96 ml | 6.0 | 3% 0.18 g | 100 ml | 1184 g/cm² |
| 0315A | 0.35 | 0.35 | 3 ml (~0.5 mol of PAA) | 97 ml | 6.0 | 3% 0.18 g | 100 ml | 1852 g/cm² |
| 0307A | 0.25 | 0.25 | 2 ml (~0.5 mol of PAA) | 98 ml | 6.0 | 3% 0.18 g | 100 ml | 1700 g/cm² |
| 0315B | 0.15 | 0.15 | 1.3 ml (~0.5 mol of PAA) | 98.7 ml | 6.0 | 3% 0.18 g | 100 ml | 1852 g/cm² |

Example 8

Hydrogel-cellulose compositions are formed by mixing cellulose with the polyacrylamide hydrogel, as shown in the following table. No PAA or PTMEG was used. The table shows the various hydrogel-cellulose mixtures thus formed ("HPMC" is hydroxypropyl methyl cellulose; "HPC" is hydroxypropyl cellulose; "MC" is methylcellulose):

| Lot | PAA | PTMEG | NaOH | AAm (g) | Crosslinker (mol %) | Water | Cellulose type | Amount |
|---|---|---|---|---|---|---|---|---|
| 0308A | — | — | — | 6.0 | 3% 0.18 g | 100 ml | HPMC | 1% aq 100 ml (0.5% w) |
| 0308B | — | — | — | 6.0 | 3% 0.18 g | 100 ml | HPC | 1% aq 100 ml (0.5% w) |
| 0308C | — | — | — | 6.0 | 3% 0.18 g | 100 ml | MC | 1% aq 100 ml (0.5% w) |

Example 9

Hydrogel-cellulose compositions are formed by mixing cellulose with the PAA-PTMEG hydrogel in the presence of acrylamide and a cross-linker in water, as shown in the following table. The table shows the various hydrogel-cellulose mixtures thus formed:

| Lot | PAA (g) | PTMEG (g) | NaOH | Water (for further NaOH dilution) | AAm (g) | Crosslinker (mol %) | Water (for reaction mixture) | Cellulose type | Amount |
|---|---|---|---|---|---|---|---|---|---|
| 0309A | 0.25 | 0.25 | 1 ml (~0.5 mol of PAA) | 99 ml | 6.0 | 3% 0.18 g | 100 ml | HPMC | 1% aq 100 ml (total 0.5% w) |
| 0321B | 0.25 | 0.25 | 1 ml (~0.5 mol of PAA) | 99 ml | 6.0 | 3% 0.18 g | 100 ml | HPMC | 1% aq 100 ml (0.5% w) |
| 0309B | 0.25 | 0.25 | 1 ml (~0.5 mol of PAA) | 99 ml | 6.0 | 3% 0.18 g | 100 ml | HPC | 1% aq 100 ml (0.5% w) |
| 0309C | 0.25 | 0.25 | 1 ml (~0.5 mol of PAA) | 99 ml | 6.0 | 3% 0.18 g | 100 ml | MC | 1% aq 100 ml (0.5% w) |

Example 10

A polyacrylamide gel is prepared using material amounts as given in the table below:

| Lot | PAA | PTMEG | NaOH | AAm (g) | Crosslinker (mol %) | Water | Results |
|---|---|---|---|---|---|---|---|
| 0302A | — | — | — | 3.0 | 3% | 100 ml | Non-shaped gel can be self healed. |

Example 11

15 g of carboxymethyl cellulose is dissolved into 2000 mL of water and then added into a 5 L reactor under stirring. The solution is continually stirred and 5 g of potassium persulfate, 200 g of acrylic acid, 1 g of ethylene dimethyl acrylate and 11 g of poly(acrylic acid) ($M_w$ of about 400,000 g/mol) is added. The reactor is heated at about 60° C., and 22 g of PTMEG (polytetramethylene ether glycol, $M_w$ of about 650 g/mol) is added into the reactor. The mixture is stirred for about another hour until polymerization is completed. The hydrogel formed above is removed from the reactor and cut into small pieces of about 1-1.5 cm$^3$. Its water-absorbency is tested.

Example 12

20 g of gelatin is dissolved into 2000 mL of water and then added into a 5 L reactor under stirring. The solution is continually stirred and 5 g of potassium persulfate, 200 g of acrylic acid, 0.5 g of ethylene dimethyl acrylate and 10 g of poly(acrylic acid) ($M_w$ of about 400,000 g/mol) is added. The reactor is heated at about 60° C., and 20 g of PTMEG (polytetramethylene ether glycol, $M_w$ of about 650 g/mol) is added into the reactor. The mixture is stirred for about another 1 hour until polymerization is completed. The hydrogel formed above is removed from the reactor and cut into small pieces of about 1-1.5 cm$^3$. Its water-absorbency is tested.

Example 13

A hydrogel is prepared by the method discussed in Example 12 above, but polyvinyl alcohol (PVA) is used instead of gelatin.

Example 14

A hydrogel is prepared by the method discussed in Example 12 above, but PVA, clay and carboxylmethyl cellulose is used instead of gelatin.

Example 15

100 g of acrylic acid is dissolved into 300 g of water (Solution A). Then, 54 g of potassium hydroxide is dissolved into Solution A under cooling. The mixture is placed into a 2 L round bottom flask equipped mechanical mixer, temperature controller and heating mantle. Then, 0.3 g of N,N'-methylene bis(acrylamide) and 1.5 g of potassium persulfate are added. Also, 10 g of polyacrylic acid and 20 g of PTMEG are added into the 22 L round bottom flask under stirring. The polymerization reaction is conducted at a temperature of 65° C. for about two hours.

Example 16

3 kg of acrylic acid is dissolved into 4.5 L of water (Solution A). Then, 1620 g of potassium hydroxide are dissolved into 4.5 L of cold water (Solution B). Solution A and Solution B are mixed under stirring. The mixture is placed into a 22 L round bottom flask equipped mechanical mixer, temperature controller and heating mantle. Then, 9.0 g of N,N'-methylene bis(acrylamide) and 45 g of potassium persulfate are added. Also, 30 g of polyacrylic acid and 60 g of PTMG were added into the 22 L round bottom flask under stirring. The polymerization reaction is conducted at a temperature of 50-55° C. for about three hours. The bulk hydrogel product is cut using a grinder and then dried at 70° C. Its absorbency of tap water is 200-250 times its dry weight.

Example 17

Same as Example 16, but only 1167 g of potassium hydroxide is used to form the hydrogel.

Example 18

3 kg of acrylic acid is dissolved into 4.5 L of water (Solution A). And, 1.16 kg of Miracle-Gro® Plant Food 24-8-16 is dissolved into 4.5 L of cold water (Solution B). Solution A and Solution B are mixed under stirring. The mixture is placed into a 22 L round bottom flask equipped mechanical mixer, temperature controller and heating mantle. Then, 9.0 g of N,N'-methylene bis(acrylamide) and 45 g of potassium persulfate are added. Also, 30 g of polyacrylic acid and 60 g of PTMEG are added into the 22 L flask under stirring. The polymerization reaction is conducted at a temperature of 50-55° C. for about three hours. The bulk product is cut using a grinder.

Example 19

3 kg of acrylic acid is dissolved into 4.5 L of water (Solution A). Then, 1167 g of potassium hydroxide and 973.7 g of 30% ammonium hydroxide aqueous are dissolved into 4.5 L of cold water (Solution B). Solution A and Solution B are mixed under stirring. The mixture is placed into a 22 L round bottom flask equipped mechanical mixer, temperature controller and heating mantle. Then, 9.0 g of N,N'-methylene bis(acrylamide) and 45 g of potassium persulfate are added. Also, 30 g of polyacrylic acid and 60 g of PTMG are added into the 22 L flask under stirring. The polymerization reaction is conducted at a temperature of 50-55° C. for about three hours to form a hydrogel.

Example 20

Figure 9:
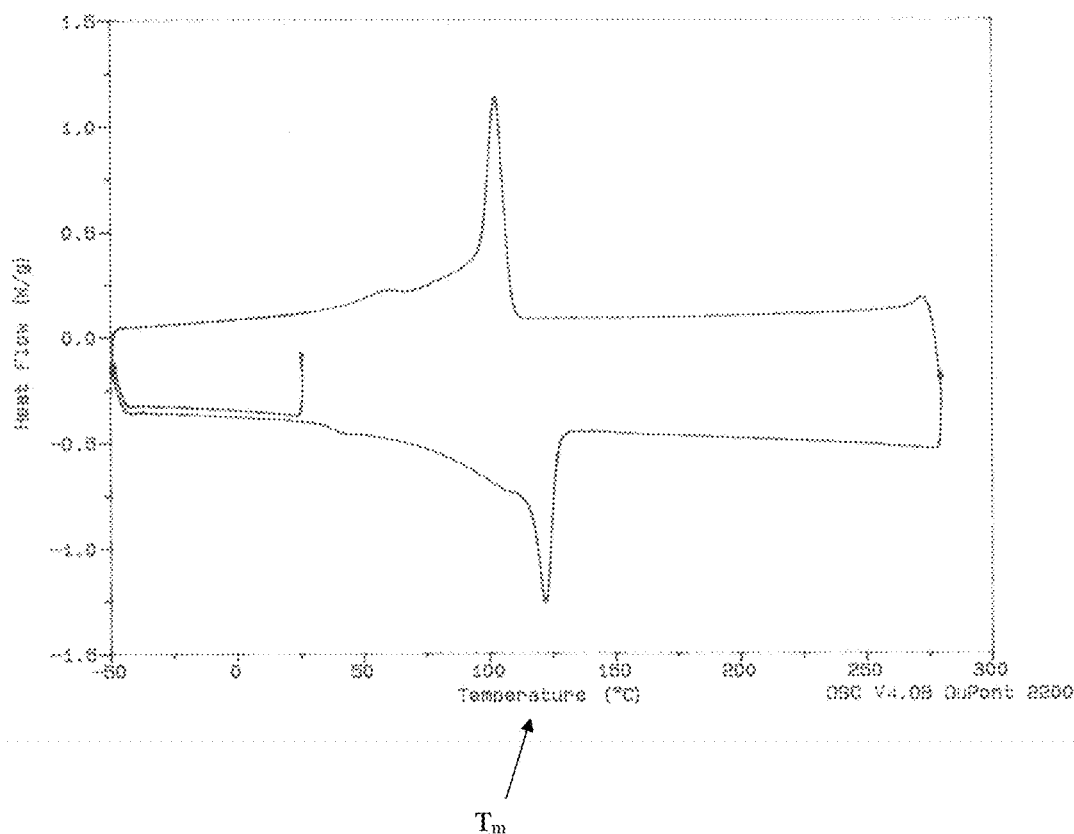
FIG. 9 shows a DSC trace of the PAA-PTMEG three-dimensional polymeric gel mixed with polyethylene polymer. The glass transition temperature, or melting temperature ($T_m$) of polyethylene mixed with the PAA-PTMEG gel is different from that of the polyethylene by itself.

The solid gel prepared as described in Example 1 is mixed with solid polyethylene under stirring for about 12 hours. A differential scanning calorimetry (DSC) trace for the resulting material is then obtained. The DSC trace is shown in FIG. 9. The trace shows the $T_m$ of the PAA-PTMEG polymeric gel blended with the polyethylene polymer, which is different from the $T_m$ of polyethylene by itself.

Example 21

Hydration and dehydration cycle tests of a hydrogel are performed. The hydration and dehydration cycle tests are conducted in a beaker. The weight of beaker is 51.00 g. 0.29 g of dried PAA-PTMEG hydrogel is used for this test. For each hydration testing, 80 ml of water is added into the beaker and the water is fully absorbed into the hydrogel for about 5 hours at room temperature. The un-absorbed water is then removed. Then, the weight of beaker plus the wetted hydrogel is recorded. The dehydration temperature is kept at about 80° C. overnight and the weight of dried hydrogel plus the beaker is then recorded. This hydration and dehydration are continuously repeated for 18 days. The results of this study are summarized in the table below, pointing to the lack of change in the weight of the hydrogel over a number of hydration-dehydration cycles.

| Days | The weight of beaker + hydrogel + water absorbed | The weight of beaker + hydrogel after drying (g) |
|---|---|---|
| 1 | 98.32 g | 51.29 |
| 2 | 99.31 g | 51.30 |
| 3 | 99.00 g | 51.30 |
| 4 | 99.50 g | 51.29 |
| 5 | 99.90 g | 51.31 |
| 6 | 99.78 g | 51.28 |
| 7 | 100.00 g | 51.29 |
| 8 | 100.00 g | 51.30 |
| 9 | 103.62 g | 51.26 |
| 10 | 101.55 g | 51.27 |
| 11 | 100.00 g | 51.27 |
| 12 | 102.40 g | 51.26 |
| 13 | 100.00 g | 51.27 |
| 14 | 100.50 g | 51.26 |
| 15 | 103.30 g | 51.25 |
| 16 | 103.62 g | 51.26 |
| 17 | 100.00 g | 51.25 |
| 18 | 99.80 g | 51.25 |

Example 22

A greenhouse tent test is conducted. 300 g of potting soil is mixed with varying amounts of dried PAA-PTMEG hydrogel (0.84 g for low concentration and 2.4 g for higher concentration). Soil is put in the water overnight so that the soil and dried hydrogel are saturated with water. Then, the pots are drained and 5 lettuces' seeds are placed on the surface of soil. A thin layer of potting soil is then poured on the seeds. The pot sets are placed in greenhouse tents, which are watered with 100 ml of water once every other day. The control pot contains 300 g of soil but without the hydrogel. The testing temperature and the humidity of the first greenhouse tent are 78.9° F. and 46% humidity, respectively; and for the second tent the temperature and humidity are 86.7° F. and 36% humidity, respectively. Thirty-two days after seeding, the average biomass of plant is recorded, as tabulated below. The results indicate significantly higher biomass (as measured by the mass of root and leaf) of the plant in cases in which hydrogel is used in the pot.

First Tent (Temperature: 78.9° F., Humidity: 46%)

| Pots | Leaf's mass (g) | Root's mass (g) |
|---|---|---|
| Control | 3.70 (100%) | 1.32 (100%) |
| 0.84 g of hydrogel | 7.19 (194%) | 2.44 (185%) |
| 2.40 g of hydrogel | 3.92 (106%) | 1.89 (143%) |

Second Tent (Temperature: 86.7° F., Humidity: 36%)

| Pots | Leaf's mass (g) | Root's mass (g) |
|---|---|---|
| Control | 0.94 (100%) | 0.48 (100%) |
| 0.84 g of hydrogel | 2.41 (256%) | 1.84 (383%) |
| 2.40 g of hydrogel | 2.74 (291%) | 1.85 (385%) |

While preferable embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A hydrogel comprising:
   a first polymeric material having polyacrylic acid;
   a second polymeric material comprising polytetramethylene ether glycol; and
   one or more species having a vinyl functionality.

2. The hydrogel of claim 1, wherein at least one of the first polymeric material and the second polymeric material is substantially a homopolymer.

3. The hydrogel of claim 1, wherein at least one of said one or more species having a vinyl functionality is selected from the group consisting of: acrylamide, acrylic acid, methylacrylic acid, vinyl alcohol, vinyl acetate, butyl acrylate, vinyl acrylate, vinylbenzoic acid, vinylbenzyl alcohol, vinylboronic acid dibutyl ester, vinylformamide, vinyl methacrylate, vinylpyridine, 1-vinyl-2-pyrrolidone, vinylsulfonic acid, and vinyltrimethoxysilane.

4. The hydrogel of claim 1, wherein the hydrogel further comprises a cross-linker selected from the group consisting of:
   di(ethyleneglycol)divinyl ether, di(ethylglycol)diacrylate, and N,N'-methylene bis(acrylamide).

5. The hydrogel of claim 1, wherein at least one of said one or more species having a vinyl functionality is covalently bonded to the first polymeric material.

6. The hydrogel of claim 1, wherein the hydrogel has a water-retention capacity of at least about 10% of the weight of the hydrogel.

7. The hydrogel of claim 1, wherein the ratio, by weight, of the first polymeric material to the second polymeric material is between about 1-to-3, and about 1-to-6.

8. The hydrogel of claim 1, wherein the hydrogel further comprises one or more of: a cellulose, gelatin, clay, carboxymethyl cellulose, a fertilizer, silica, polyethylene and polystyrene.

9. The hydrogel of claim 1, wherein the hydrogel exhibits at least one of: a tensile strength of about 1000 g/cm2 to about 4000 g/cm2, and an impact strength of about 1000 g/cm2 to about 4000 g/cm2.

10. The hydrogel of claim 1, wherein at least one of: the Mw (g/mol) of the first polymeric material is from about 250,000 to about 1,000,000, and the Mw (g/mol) of the second polymeric material is from about 650 to about 2,000.

11. A method for forming the hydrogel according to claim 1, comprising:
   providing, in a reaction vessel, a first polymeric material having polyacrylic acid, a second polymeric material comprising polytetramethylene ether glycol, and one or more species having a vinyl functionality to form a mixture of said first polymeric material, said second polymeric material and one or more species having a vinyl functionality; and
   mixing said mixture.

12. The method of claim 11, wherein at least one of the first polymeric material and the second polymeric material is substantially a homopolymer.

13. The method of claim 11, wherein the first polymeric material and the second polymeric material are provided in a ratio by weight between about 1-to-3, and about 1-to-6.

14. The method of claim 11, further comprising at least one of: heating said mixture and mixing said mixture between about 15° C. and 30° C.

15. The method of claim 11, wherein at least one of said one or more species having a vinyl functionality is selected from the group consisting of acrylamide, acrylic acid, methylacrylic acid, vinyl alcohol, vinyl acetate, butyl acrylate, vinyl acrylate, vinylbenzoic acid, vinylbenzyl alcohol, vinylboronic acid dibutyl ester, vinylformamide, vinyl methacrylate, vinylpyridine, 1-vinyl-2-pyrrolidone, vinylsulfonic acid, and vinyltrimethoxysilane.

16. A gel, comprising:
   a first polymeric material having polyacrylic acid; and
   a second polymeric material comprising polytetramethylene ether glycol, wherein the first polymeric material is hydrogen-bonded to the second polymeric material.

17. The gel of claim 16, wherein at least one of the first polymeric material and the second polymeric material is substantially a homopolymer.

18. The gel of claim 16, wherein the ratio, by weight, of the first polymeric material to the second polymeric material is between about 1-to-3, and about 1-to-6.

19. The gel of claim 16, wherein the gel exhibits at least one of: a tensile strength of about 1000 g/cm2 to about 4000 g/cm2, and an impact strength of about 1000 g/cm2 to about 4000 g/cm2.

20. The gel of claim 16, wherein at least one of:
   the Mw (g/mol) of the first polymeric material is from about 250,000 to about 1,000,000, and the Mw (g/mol) of the second polymeric material is from about 650 to about 2,000.

21. The gel of claim 16, wherein the gel comprises a hydrogel having a water-retention capacity of at least about 10% of the weight of the hydrogel.

22. The gel of claim 16, wherein the gel comprises a hydrogel, and the hydrogel further comprises one or more of: a cellulose, gelatin, clay, carboxymethyl cellulose, a fertilizer, silica, polyethylene and polystyrene.

23. The hydrogel of claim 1, wherein the hydrogel has a water-retention capacity of at least about 20% of the weight of the hydrogel.

24. The hydrogel of claim 1, wherein the hydrogel has a water-retention capacity of at least about 100% of the weight of the hydrogel.

25. The hydrogel of claim 1, wherein the hydrogel has a water-retention capacity of at least about 10 times the weight of the hydrogel.

26. The hydrogel of claim 1, wherein the hydrogel has a water-retention capacity of at least about 50 times the weight of the hydrogel.

27. The gel of claim 16, wherein the gel comprises a hydrogel, and the hydrogel has a water-retention capacity of at least about 20% of the weight of the hydrogel.

28. The gel of claim 16, wherein the gel comprises a hydrogel, and the hydrogel has a water-retention capacity of at least about 100% of the weight of the hydrogel.

29. The gel of claim 16, wherein the gel comprises a hydrogel, and the hydrogel has a water-retention capacity of at least about 10 times the weight of the hydrogel.

30. The gel of claim 16, wherein the gel comprises a hydrogel, and the hydrogel has a water-retention capacity of at least about 50 times the weight of the hydrogel.

31. A three-dimensional gel formed from:
   a first polymeric material comprising polyacrylic acid; and
   a second polymeric material comprising a polyglycol having $-O(CH_2)_n-$ units,
where n is a number greater than or equal to 3,
wherein the first polymeric material is hydrogen-bonded to the second polymeric material.

32. The three-dimensional gel according to claim 31, further comprising at least one of: one or more unsaturated monomer species having a vinyl functionality; and methacrylic acid.

33. A method of forming the three-dimensional gel according to claim 31, comprising mixing the first polymeric material and the second polymeric material in a reaction vessel.

* * * * *